United States Patent
Lott et al.

(10) Patent No.: US 6,970,437 B2
(45) Date of Patent: Nov. 29, 2005

(54) REVERSE LINK DIFFERENTIATED SERVICES FOR A MULTIFLOW COMMUNICATIONS SYSTEM USING AUTONOMOUS ALLOCATION

(75) Inventors: Christopher G. Lott, San Diego, CA (US); Naga Bhushan, San Diego, CA (US); Rashid A. Attar, San Diego, CA (US); Jean Put Ling Au, San Diego, CA (US); Donna Ghosh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/890,719

(22) Filed: Jul. 13, 2004

(65) Prior Publication Data

US 2005/0014524 A1 Jan. 20, 2005

Related U.S. Application Data

(60) Provisional application No. 60/527,081, filed on Dec. 3, 2003, provisional application No. 60/493,782, filed on Aug. 6, 2003, and provisional application No. 60/487,648, filed on Jul. 15, 2003.

(51) Int. Cl.[7] .............................................. H04B 7/185
(52) U.S. Cl. ....................... 370/318; 370/317; 455/13.4
(58) Field of Search ................................ 370/317, 318, 370/328, 329, 437, 438, 439; 455/10, 13.4, 63.1, 453, 501, 504

(56) References Cited

U.S. PATENT DOCUMENTS

| | | | | |
|---|---|---|---|---|
| 2004/0071110 | A1 | * 4/2004 | Guey et al. | .................. 370/329 |
| 2004/0179525 | A1 | * 9/2004 | Balasubramanian et al. | ..... 370/391 |
| 2004/0203397 | A1 | * 10/2004 | Yoon et al. | ................. 455/63.1 |
| 2005/0036458 | A1 | * 2/2005 | Yoon et al. | .................. 370/328 |

FOREIGN PATENT DOCUMENTS

WO    2004/019649 A2    3/2004

* cited by examiner

*Primary Examiner*—Phirin Sam
(74) *Attorney, Agent, or Firm*—Phil R. Wadsworth; Sandra L. Godsey

(57) ABSTRACT

An access terminal (206) is configured for wireless communication with an access network (204) within a sector (1032). The access terminal (206) includes a transmitter (2608) for transmitting a reverse traffic channel to the access network (204), an antenna (2614) for receiving signals from the access network (204), a processor (2602) and memory (2604) in electronic communication with the processor (2602). Instructions are stored in the memory (2604). The instructions are executable estimate a current value of a reverse activity bit (1444) transmitted by the access network (204). Per flow power allocation may be decreased on increased based on an estimated current value of the reverse activity bit.

13 Claims, 21 Drawing Sheets

REVERSE LINK DIFFERENTIATED SERVICES FOR A MULTIFLOW COMMUNICATIONS SYSTEM USING AUTONOMOUS ALLOCATION

CLAIM OF PRIORITY UNDER 35 U.S.C. §119

The present Application for Patent claims priority to Provisional Application No. 60/487,648, entitled "Reverse Link Differentiated Services for a Multiflow Communications System Using Autonomous Allocation," filed Jul. 15, 2003, and assigned to the assignee hereof and hereby expressly incorporated by reference herein.

The present Application for Patent also claims priority to Provisional Application No. 60/493,782, entitled "Cooperative Autonomous And Scheduled Resource Allocation For A Distributed Communication System," filed Aug. 6, 2003, and assigned to the assignee hereof and hereby expressly incorporated by reference herein.

The present Application for Patent also claims priority to Provisional Application No. 60/527,081, entitled "Multiflow Reverse Link MAC for a Communication System," filed Dec. 3, 2003, and assigned to the assignee hereof and hereby expressly incorporated by reference herein.

BACKGROUND

1. Field

The present invention relates generally to wireless communications systems, and more specifically, to improvements in the operation of a medium access control (MAC) layer of an access terminal in a wireless communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as code division multiple-access (CDMA), time division multiple-access (TDMA), frequency division multiple-access (FDMA), and amplitude modulation multiple-access (AM).

A multiple-access communication system may be a wireless or wire-line and may carry voice and/or data. In a multiple-access communication system, communications between users are conducted through one or more base stations. A first user on one subscriber station communicates to a second user on a second subscriber station by transmitting data on a reverse link to a base station. The base station receives the data and may route the data to another base station. The data is transmitted on a forward channel of the same base station, or the other base station, to the second subscriber station. The forward channel refers to transmission from a base station to a subscriber station and the reverse channel refers to transmission from a subscriber station to a base station. Likewise, the communication may be conducted between a first user on one mobile subscriber station and a second user on a landline station. A base station receives the data from the user on a reverse channel, and routes the data through a public switched telephone network (PSTN) to the second user. In many communication systems, e.g., IS-95, W-CDMA, IS-2000, the forward channel and the reverse channel are allocated separate frequencies.

An example of a data optimized communication system is a high data rate (HDR) communication system. In an HDR communication system, the base station is sometimes referred to as an access network, and the remote station is sometimes referred to as an access terminal (AT). Functionality performed by an AT may be organized as a stack of layers, including a medium access control (MAC) layer. The MAC layer offers certain services to higher layers, including services that are related to the operation of the reverse channel. Benefits may be realized by improvements in the operation of a MAC layer of an AT in a wireless communication system.

SUMMARY

An access terminal that is configured for wireless communication with an access network within a sector is disclosed. The access terminal includes a transmitter for transmitting a reverse traffic channel to the access network, an antenna for receiving signals from the access network, a processor and memory in electronic communication with the processor. Instructions are stored in the memory. The instructions are executable to implement a method that involves estimating a current value of a reverse activity bit transmitted by the access network.

If the estimated current value of the reverse activity bit indicates that the sector is busy, the method also involves decreasing a current power allocation for each flow of a plurality of flows on the access terminal. The magnitude of the decrease for a particular flow may be determined according to a downward ramping function that is designed for the flow. The downward ramping function may be a function of the current power allocation for the flow.

If the estimated current value of the reverse activity bit indicates that the sector is idle, the method also involves increasing the current power allocation for each flow of the plurality of flows on the access terminal. The magnitude of the increase for a particular flow may be determined according to an upward ramping function that is designed for the flow. The upward ramping function may be a function of the current power allocation for the flow.

In some embodiments, estimating the current value of the reverse activity bit may be performed once every slot. The estimating may involve filtering a signal received from the access network with a filter having an adjustable time constant.

The method may additionally involve estimating a loading level of the sector, and determining a peak power allocation for each flow of the plurality of flows. The peak power allocation for a particular flow may be a function of the current power allocation for the flow and the estimate of the loading level of the sector.

In some embodiments, the method may additionally involve, for each flow, determining an accumulated power allocation for the flow. The current power allocation for the flow and the accumulated power allocation for the flow may be used to determine a total available power for the flow. The total available power for the flow may be used to determine a power level for a packet that is transmitted to the access network. In some embodiments, the accumulated power allocation for the flow may be limited by a saturation level. The saturation level may be a settable factor above a peak power allocation.

The downward ramping function and the upward ramping function may both be dependent on an estimate of a loading level of the sector. Alternatively, or in addition, the downward ramping function and the upward ramping function may both be dependent on a pilot strength measured by the access terminal.

Another embodiment of an access terminal that is configured for wireless communication with an access network within a sector is also disclosed. The access terminal includes means for estimating a current value of a reverse activity bit transmitted by the access network.

The access terminal also includes means for decreasing a current power allocation for each flow of a plurality of flows on the access terminal if the estimated current value of the reverse activity bit indicates that the sector is busy. The magnitude of the decrease for a particular flow may be determined according to a downward ramping function that is designed for the flow. The downward ramping function may be a function of the current power allocation for the flow.

The access terminal also includes means for increasing the current power allocation for each flow of the plurality of flows on the access terminal if the estimated current value of the reverse activity bit indicates that the sector is idle. The magnitude of the increase for a particular flow may be determined according to an upward ramping function that is designed for the flow. The upward ramping function may be a function of the current power allocation for the flow.

The access terminal may also include means for estimating a loading level of the sector. The access terminal may also include means for determining a peak power allocation for each flow of the plurality of flows. The peak power allocation for a particular flow may be a function of the current power allocation for the flow and the estimate of the loading level of the sector.

The access terminal may also include, for each flow, means for determining an accumulated power allocation for the flow, and means for using the current power allocation for the flow and the accumulated power allocation for the flow to determine a total available power for the flow. The access terminal may also include means for using the total available power for the flow to determine a power level for a packet that is transmitted to the access network.

DETAILED DESCRIPTION

Figure 1:
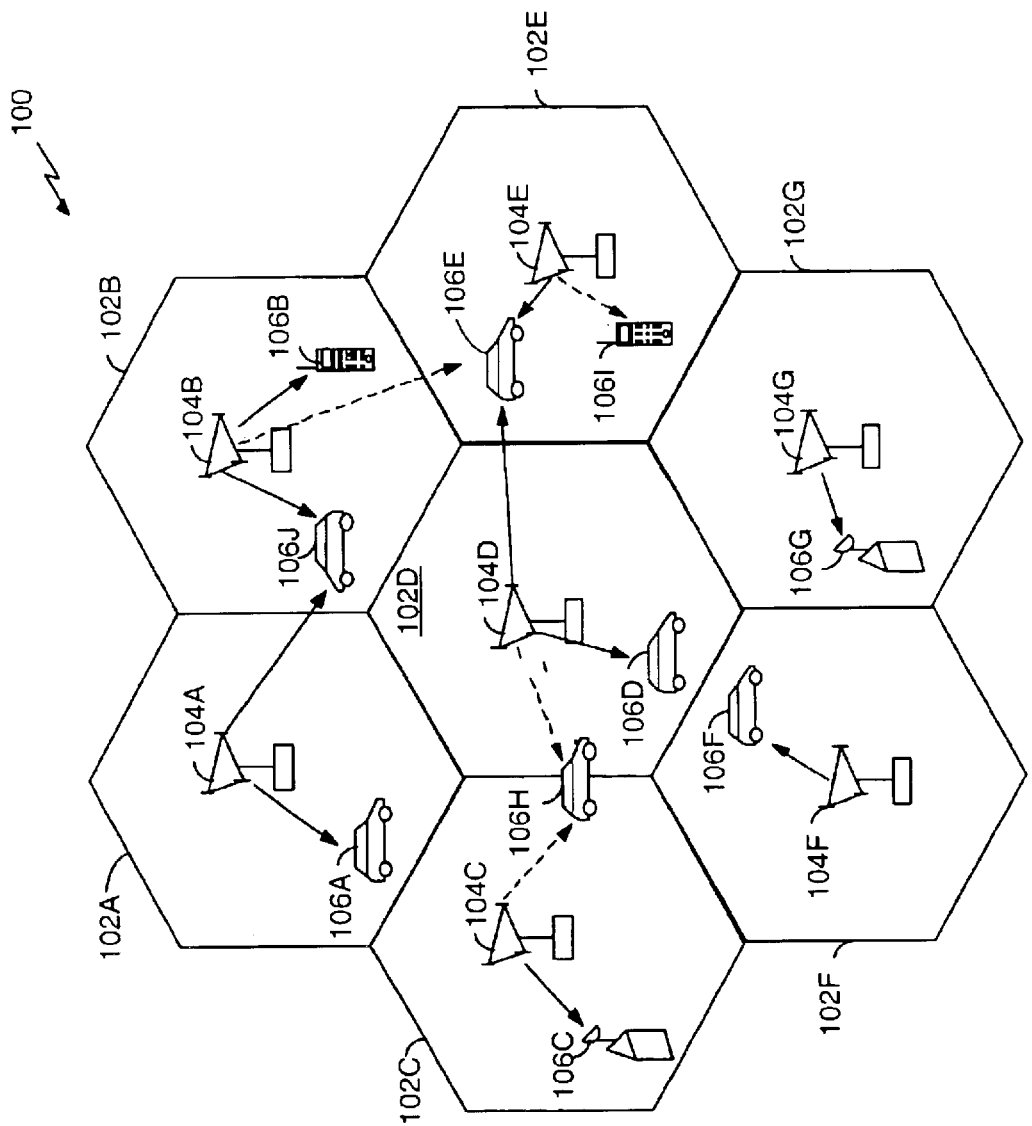
FIG. 1 illustrates an example of a communications system that supports a number of users and is capable of implementing at least some aspects of the embodiments discussed herein.

The word "exemplary" is used herein to mean "serving as an example, instance, or illustration." Any embodiment described herein as "exemplary" is not necessarily to be construed as preferred or advantageous over other embodiments.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a mobile IP network and any other system desiring to receive and process a wireless signal.

The exemplary embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A wireless communication system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR45.5 referred to herein as the cdma2000 standard, formerly called IS-2000 MC. The standards cited hereinabove are hereby expressly incorporated herein by reference.

The systems and methods described herein may be used with high data rate (HDR) communication systems. An HDR communication system may be designed to conform to one or more standards such as the "cdma2000 High Rate Packet Data Air Interface Specification," 3GPP2 C.S0024-A, Version 1, March 2004, promulgated by the consortium "3rd Generation Partnership Project 2." The contents of the aforementioned standard are incorporated by reference herein.

An HDR subscriber station, which may be referred to herein as an access terminal (AT), may be mobile or stationary, and may communicate with one or more HDR base stations, which may be referred to herein as modem pool transceivers (MPTs). An access terminal transmits and receives data packets through one or more modem pool transceivers to an HDR base station controller, which may be referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or landline phone. The communication channel through which the access terminal sends signals to the modem pool transceiver is called a reverse channel. The communication channel through which a modem pool transceiver sends signals to an access terminal is called a forward channel.

FIG. 1 illustrates an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A–102G, each of which is serviced by a corresponding base station 104A–104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Remote stations 106 in the coverage area may be fixed (i.e., stationary) or mobile. As shown in FIG. 1, various remote stations 106 are dispersed throughout the system. Each remote station 106 communicates with at least one and possibly more base stations 104 on the forward channel and the reverse channel at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System," which is assigned to the assignee of the present invention.

The forward channel refers to transmission from the base station 104 to the remote station 106, and the reverse channel refers to transmission from the remote station 106 to the base station 104. In the exemplary embodiment, some of the remote stations 106 have multiple receive antennas and others have only one receive antenna. In FIG. 1, base station 104A transmits data to remote stations 106A and 106J on the forward channel, base station 104B transmits data to remote stations 106B and 106J, base station 104C transmits data to remote station 106C, and so on.

Figure 2:
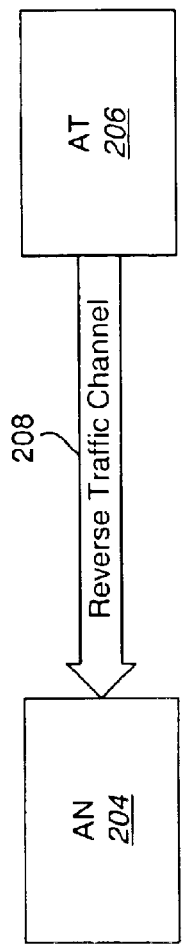
FIG. 2 is a block diagram illustrating an access network and an access terminal in a high data rate communication system.

In a high data rate (HDR) communication system, the base station is sometimes referred to as an access network (AN), and the remote station is sometimes referred to as an access terminal (AT). FIG. 2 illustrates an AN 204 and an AT 206 in an HDR communication system.

The AT 206 is in wireless communication with the AN 204. As indicated previously, the reverse channel refers to transmissions from the AT 206 to the AN 204. The reverse traffic channel 208 is shown in FIG. 2. The reverse traffic channel 208 is the portion of the reverse channel that carries information from a specific AT 206 to the AN 204. Of course, the reverse channel may include other channels in addition to the reverse traffic channel 208. Also, the forward channel may include a plurality of channels, including a pilot channel.

Figure 3:
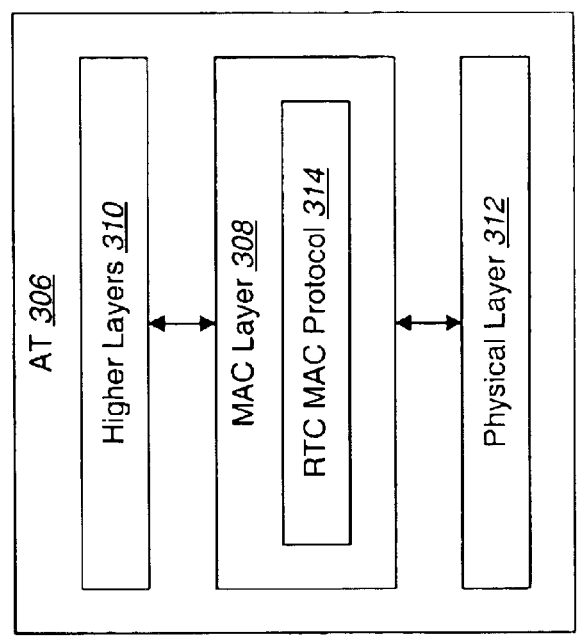
FIG. 3 is a block diagram illustrating a stack of layers on an access terminal.

Functionality performed by the AT 206 may be organized as a stack of layers. FIG. 3 illustrates a stack of layers on the AT 306. Among the layers is a medium access control (MAC) layer 308. Higher layers 310 are located above the MAC layer 308. The MAC layer 308 offers certain services to the higher layers 310, including services that are related to the operation of the reverse traffic channel 208. The MAC layer 308 includes an implementation of the reverse traffic channel (RTC) MAC protocol 314. The RTC MAC protocol 314 provides the procedures followed by the AT 306 to transmit, and by the AN 204 to receive, the reverse traffic channel 208.

A physical layer 312 is located below the MAC layer 308. The MAC layer 308 requests certain services from the physical layer 312. These services are related to the physical transmission of packets to the AN 204.

Figure 4:
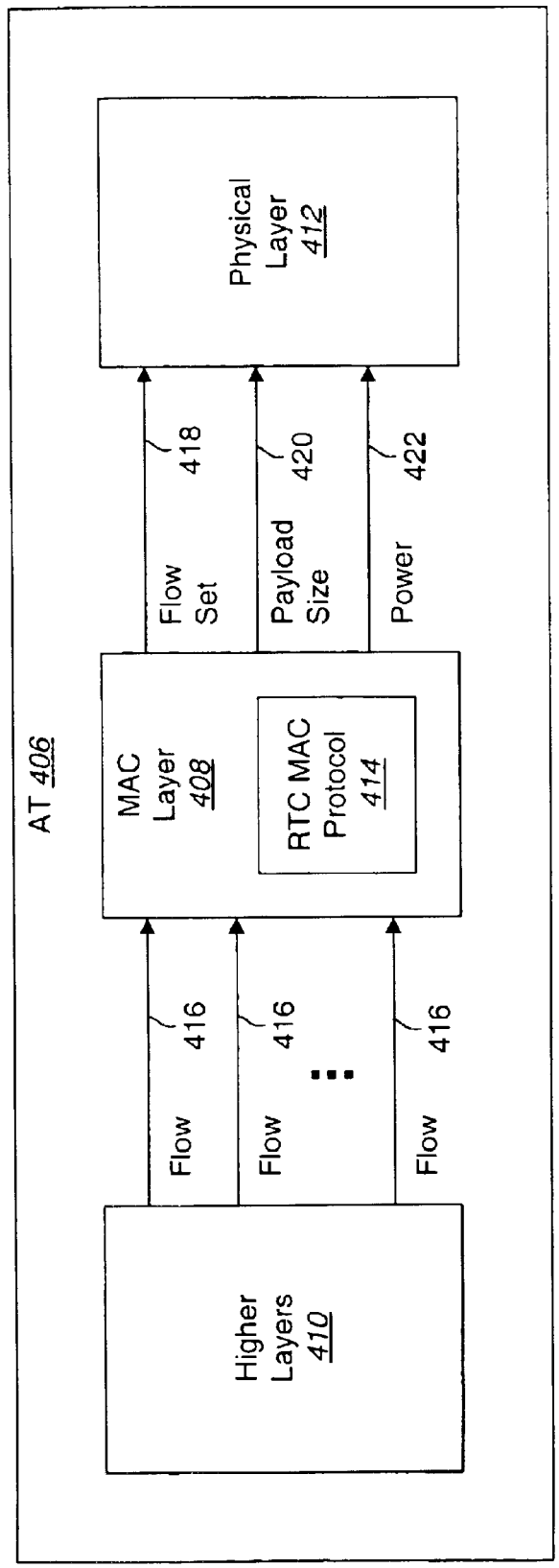
FIG. 4 is a block diagram illustrating exemplary interaction between higher layers on an access terminal, the medium access control layer, and the physical layer.

FIG. 4 illustrates exemplary interaction between the higher layers 410 on the AT 406, the MAC layer 408, and the physical layer 412. As shown, the MAC layer 408 receives one or more flows 416 from the higher layers 410. A flow 416 is a stream of data. Typically, a flow 416 corresponds to a specific application, such as voice over IP (VoIP), videotelephony, file transfer protocol (FTP), gaming, etc.

Data from the flows 416 on the AT 406 is transmitted to the AN 204 in packets. In accordance with the RTC MAC protocol 414, the MAC layer determines a flow set 418 for each packet. Sometimes multiple flows 416 on the AT 406 have data to transmit at the same time. A packet may include data from more than one flow 416. However, sometimes there may be one or more flows 416 on the AT 406 that have data to transmit, but that are not included in a packet. The flow set 418 of a packet indicates the flows 416 on the AT 406 that are to be included in that packet. Exemplary methods for determining the flow set 418 of a packet will be described below.

The MAC layer 408 also determines the payload size 420 of each packet. The payload size 420 of a packet indicates how much data from the flow set 418 is included in the packet.

The MAC layer 408 also determines the power level 422 of the packet. In some embodiments, the power level 422 of the packet is determined relative to the power level of the reverse pilot channel.

For each packet that is transmitted to the AN 204, the MAC layer 408 communicates the flow set 418 to be included in the packet, the payload size 420 of the packet, and the power level 422 of the packet to the physical layer 412. The physical layer 412 then effects transmission of the packet to the AN 204 in accordance with the information provided by the MAC layer 308.

Figure 5A:
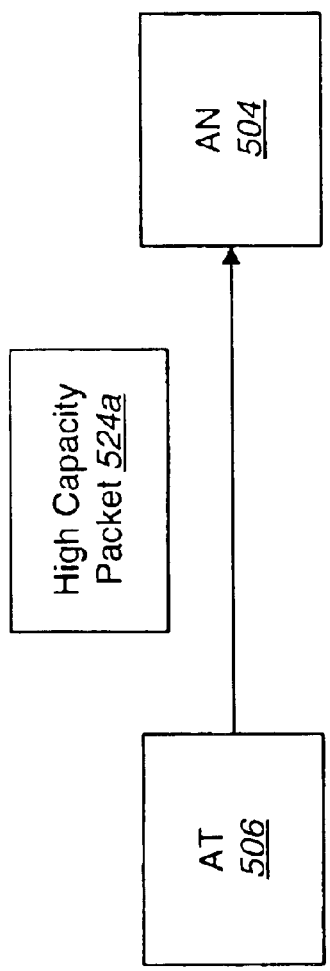
FIG. 5A is a block diagram illustrating a high capacity packet being transmitted to the access network.
Figure 5B:
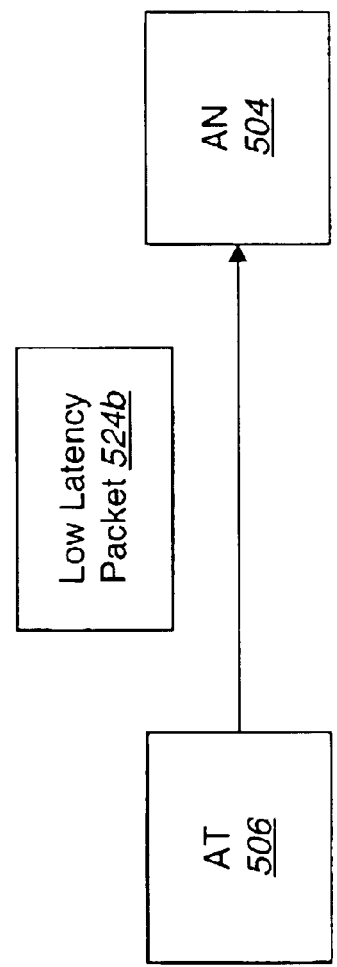
FIG. 5B is a block diagram illustrating a low latency packet being transmitted to the access network.

FIGS. 5A and 5B illustrate packets 524 being transmitted from the AT 506 to the AN 504. A packet 524 may be transmitted in one of several possible transmission modes. For example, in some embodiments there are two possible transmission modes, a high capacity transmission mode and a low latency transmission mode. FIG. 5A illustrates a high capacity packet 524a (i.e., a packet 524a that is transmitted in high capacity mode) being transmitted to the AN 504. FIG. 5B illustrates a low latency packet 524b (i.e., a packet 524b that is transmitted in low latency mode) being transmitted to the AN 504.

A low latency packet 524b is transmitted at a higher power level 422 than a high capacity packet 524a of the same packet size. Therefore, it is probable that a low latency packet 524b will arrive more quickly at the AN 504 than a high capacity packet 524a. However, a low latency packet 524b causes more loading on the system 100 than a high capacity packet 524a.

Figure 6:
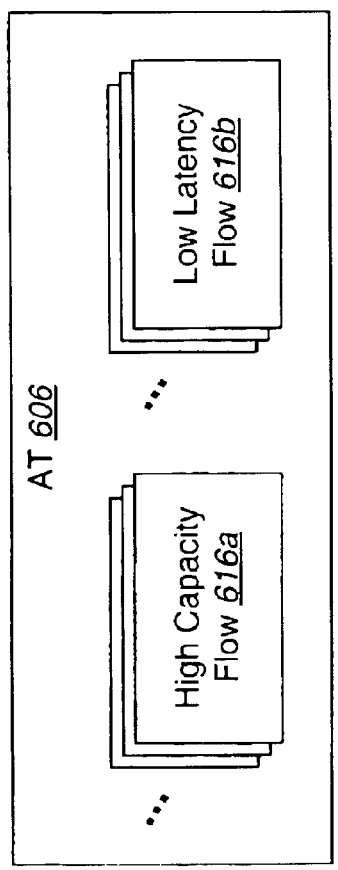
FIG. 6 is a block diagram illustrating different types of flows that may exist on an access network.

FIG. 6 illustrates different types of flows 616 that may exist on an AT 606. In some embodiments, each flow 616 on an AT 606 is associated with a particular transmission mode. Where the possible transmission modes are a high capacity transmission mode and a low latency transmission mode, an AT 606 may include one or more high capacity flows 616a and/or one or more low latency flows 616b. It is preferable for a high capacity flow 616a to be transmitted in a high capacity packet 524a. It is preferable for a low latency flow 616b to be transmitted in a low latency packet 524b.

Figure 7:
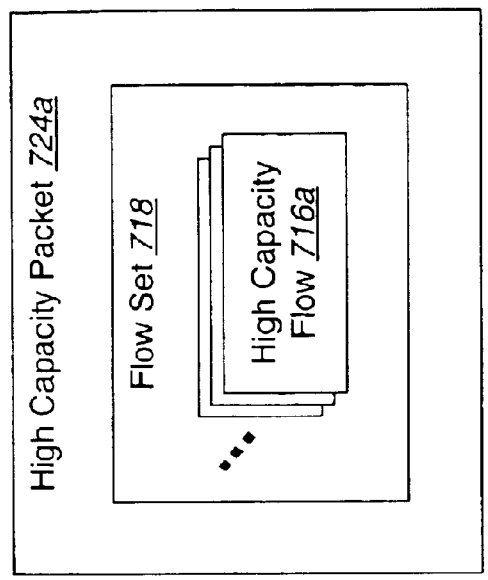
FIG. 7 is a block diagram illustrating an exemplary flow set for a high capacity packet.

FIG. 7 illustrates an exemplary flow set 718 for a high capacity packet 724a. In some embodiments, a packet 724a is transmitted in high capacity mode only if all of the flows 716 that have data to transmit are high capacity flows 716a. Accordingly, in such embodiments, the flow set 718 in a high capacity packet 724a only includes high capacity flows 716a. Alternatively, low latency flows 616b may be included in high capacity packets 724a, at the discretion of the AT 606. One exemplary reason to do this is when the low latency flow 616b is not getting enough throughput. For example, it might be detected that the queue of the low latency flow 616b is building up. The flow may improve its throughput by using high capacity mode instead, at the expense of increased latency.

Figure 8:
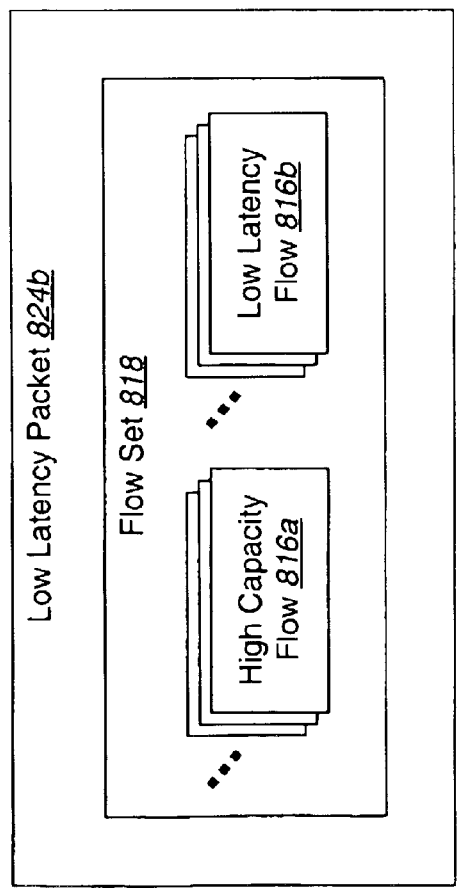
FIG. 8 is a block diagram illustrating an exemplary flow set for a low latency packet.

FIG. 8 illustrates an exemplary flow set 818 for a low latency packet 824b. In some embodiments, if there is at least one low latency flow 816b that has data to transmit, then the packet 824b is transmitted in low latency mode. The flow set 818 in a low latency packet 824b includes each low latency flow 816b that has data to transmit. One or more of the high capacity flows 816a that have data to transmit may also be included in the flow set 818. However, one or more of the high capacity flows 816a that have data to transmit may not be included in the flow set 818.

Figure 9:
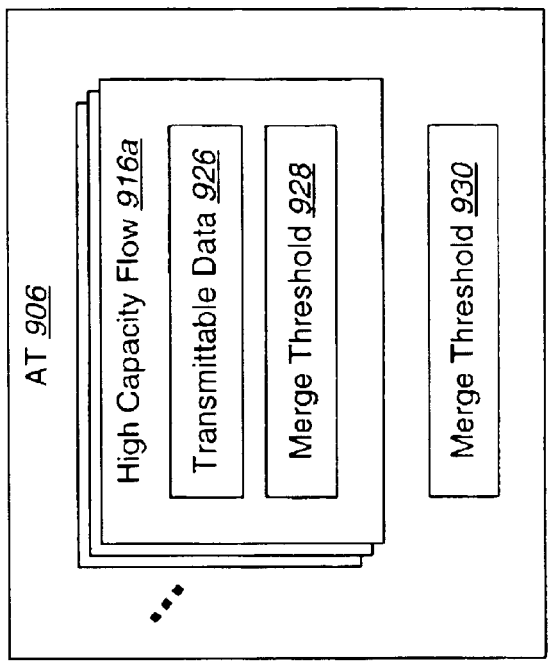
FIG. 9 is a block diagram illustrating information that may be maintained at an access terminal in order to determine whether a high capacity flow is included in the flow set of a low latency packet.

FIG. 9 illustrates information that may be maintained at the AT 906 in order to determine whether a high capacity flow 916a is included in the flow set 818 of a low latency packet 824b. Each high capacity flow 916a on the AT 906 has a certain amount of data 926 that is available for transmission. Also, a merge threshold 928 may be defined for each high capacity flow 916a on the AT 906. In addition, a merge threshold 930 may be defined for the AT 906 as a whole. Finally, a merging of high capacity flows may occur when an estimate of the loading level of the sector is less than a threshold value. (How the estimate of the loading level of the sector is determined will be discussed below.) That is, when the sector is sufficiently lightly loaded, the efficiency loss of merging is not important and aggressive usage is allowed.

In some embodiments, a high capacity flow 916a is included in a low latency packet 524b if either of two conditions is satisfied. The first condition is that the sum of the transmittable data 926 for all of the high capacity flows 916a on the AT 906 exceeds the merge threshold 930 that is defined for the AT 906. The second condition is that the transmittable data 926 for the high capacity flow 916a exceeds the merge threshold 928 that is defined for the high capacity flow 916a.

The first condition relates to the power transition from low latency packets 824b to high capacity packets 724a. If high capacity flows 916a are not included in low latency packets 824b, data from the high capacity flows 916a builds up as long as there is data available for transmission from at least one low latency flow 816b. If too much data from the high capacity flows 916a is allowed to accumulate, then the next time that a high capacity packet 724a is transmitted, there may be an unacceptably sharp power transition from the last low latency packet 824b to the high capacity packet 724a. Therefore, in accordance with the first condition, once the amount of transmittable data 926 from the high capacity flows 916a on the AT 906 exceeds a certain value (defined by the merge threshold 930), "merging" of data from the high capacity flows 916a into low latency packets 824b is allowed.

The second condition relates to the quality of service (QOS) requirements for the high capacity flows 916a on the AT 906. If the merge threshold 928 for a high capacity flow 916a is set to a very large value, this means that the high capacity flow 916a is rarely, if ever included in a low latency packet 824b. Consequently, such a high capacity flow 916a may experience transmission delays, because it is not transmitted whenever there is at least one low latency flow 816b with data to transmit. Conversely, if the merge threshold 928 for a high capacity flow 916a is set to a very small value, this means that the high capacity flow 916a is almost always included in a low latency packet 824b. Consequently, such high capacity flows 916a may experience very little transmission delay. However, such high capacity flows 916a use up more sector resources to transmit their data.

Advantageously, in some embodiments, the merge threshold 928 for some of the high capacity flows 916a on the AT 906 may be set to a very large value, while the merge threshold 928 for some other high capacity flows 916a on the AT 906 may be set to a very small merge threshold 928. Such a design is advantageous because some types of high capacity flows 916a may have strict QOS requirements, while others may not. An example of a flow 916 that has strict QOS requirements and that may be transmitted in high capacity mode is real-time video. Real-time video has a high bandwidth requirement, which may make it inefficient for transmission in low latency mode. However, arbitrary transmission delays are not desired for real-time video. An example of a flow 916 that does not have strict QOS delay requirements and that may be transmitted in high capacity mode is a best effort flow 916.

Figure 10:
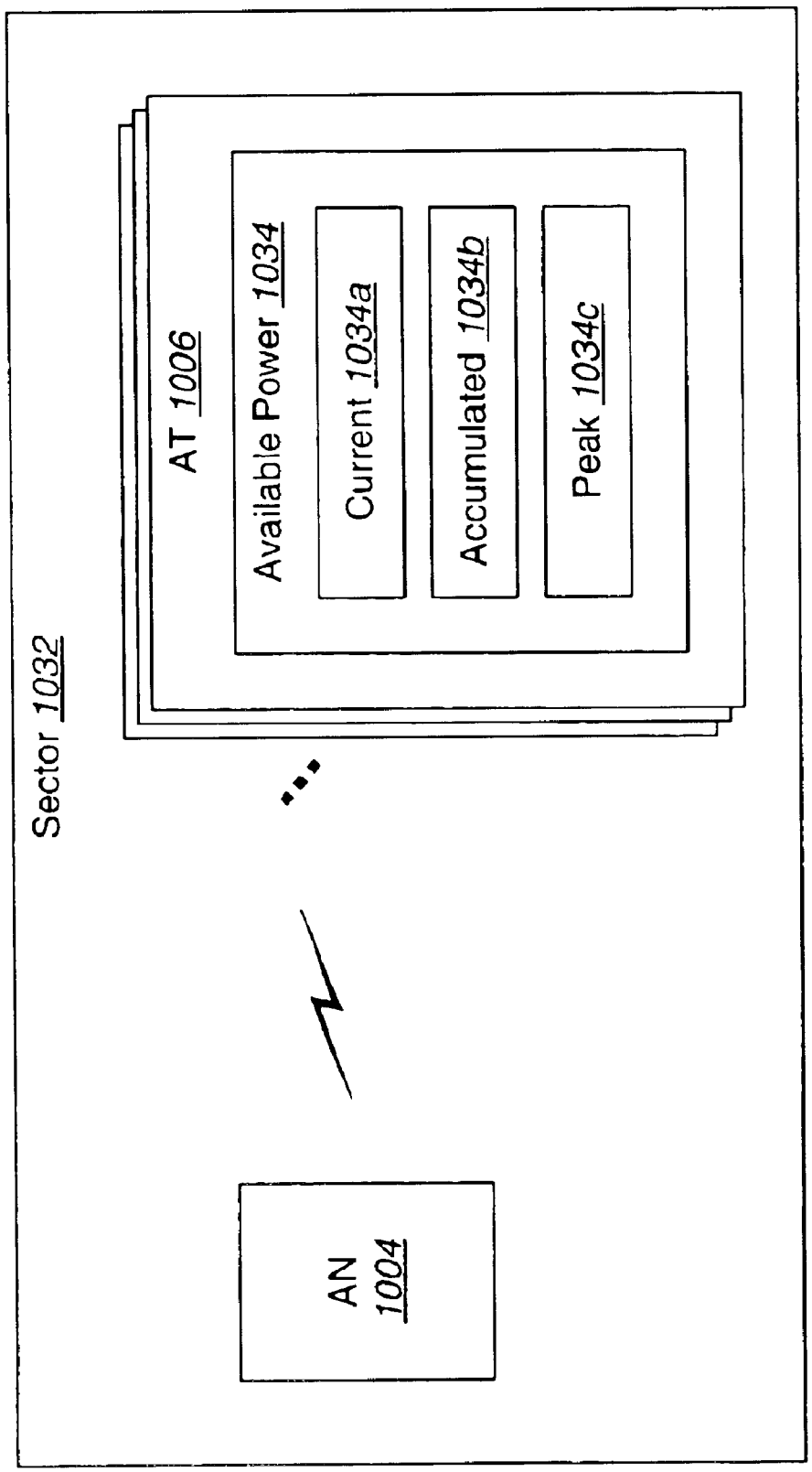
FIG. 10 is a block diagram illustrating an access network and a plurality of access terminals within a sector.

FIG. 10 illustrates an AN 1004 and a plurality of ATs 1006 within a sector 1032. A sector 1032 is a geographic region in which the signals from an AN 1004 may be received by an AT 1006, and vice versa.

One property of some wireless communication systems, such as CDM systems, is that transmissions interfere with each other. Therefore, to ensure that there is not too much interference between ATs 1006 within the same sector 1032, there is a limited amount of power received at the AN 1004 that the ATs 1006, collectively, may use. To ensure that the ATs 1006 stay within this limit, a certain amount of power 1034 is available to each AT 1006 within the sector 1032 for transmissions on the reverse traffic channel 208. Each AT 1006 sets the power level 422 of the packets 524 that it transmits on the reverse traffic channel 208 so as not to exceed its total available power 1034.

The power level 1034 that is allocated to an AT 1006 may not be exactly equal to the power level 422 that the AT 1006 uses to transmit packets 524 on the reverse traffic channel 208. For example, in some embodiments there is a set of discrete power levels that the AT 1006 selects from in determining the power level 422 of a packet 524. The total available power 1034 for an AT 1006 may not be exactly equal to any of the discrete power levels.

The total available power 1034 that is not used at any given time is allowed to accumulate, so that it may be used at a subsequent time. Thus, in such embodiments, the total available power 1034 for an AT 1006 is (roughly) equal to a current power allocation 1034a plus at least some portion of an accumulated power allocation 1034b. The AT 1006 determines the power level 422 of a packet 524 so that it does not exceed the total available power 1034 for the AT 1006.

The total available power 1034 for an AT 1006 may not always equal the AT's 1006 current power allocation 1034a plus the AT's 1006 accumulated power allocation 1034b. In some embodiments, the AT's 1006 total available power 1034 may be limited by a peak allocation 1034c. The peak allocation 1034c for an AT 1006 may be equal to the current power allocation 1034a for the AT 1006 multiplied by some limiting factor. For example, if the limiting factor is two, then the AT's 1006 peak allocation 1034c is equal to twice its current power allocation 1034a. In some embodiments, the limiting factor is a function of the current power allocation 1034a for the AT 1006.

Providing a peak allocation 1034c for the AT may limit how "bursty" the AT's 1006 transmissions are allowed to be. For example, it may occur that an AT 1006 does not have data to transmit during a certain period of time. During this period of time, power may continue to be allocated to the AT 1006. Because there is no data to transmit, the allocated power accumulates. At some point, the AT 1006 may suddenly have a relatively large amount of data to transmit. At this point, the accumulated power allocation 1034b may be relatively large. If the AT 1006 were allowed to use the entire accumulated power allocation 1034b, then the AT's 1006 transmitted power 422 may experience a sudden, rapid increase. However, if the AT's 1006 transmitted power 422 increases too rapidly, this may affect the stability of the system 100. Accordingly, the peak allocation 1034c may be provided for the AT 1006 to limit the total available power 1034 of the AT 1006 in circumstances such as this. Note that the accumulated power allocation 1034b is still available, but its use is spread out over more packets when the peak allocation 1034c is limited.

Figure 11:
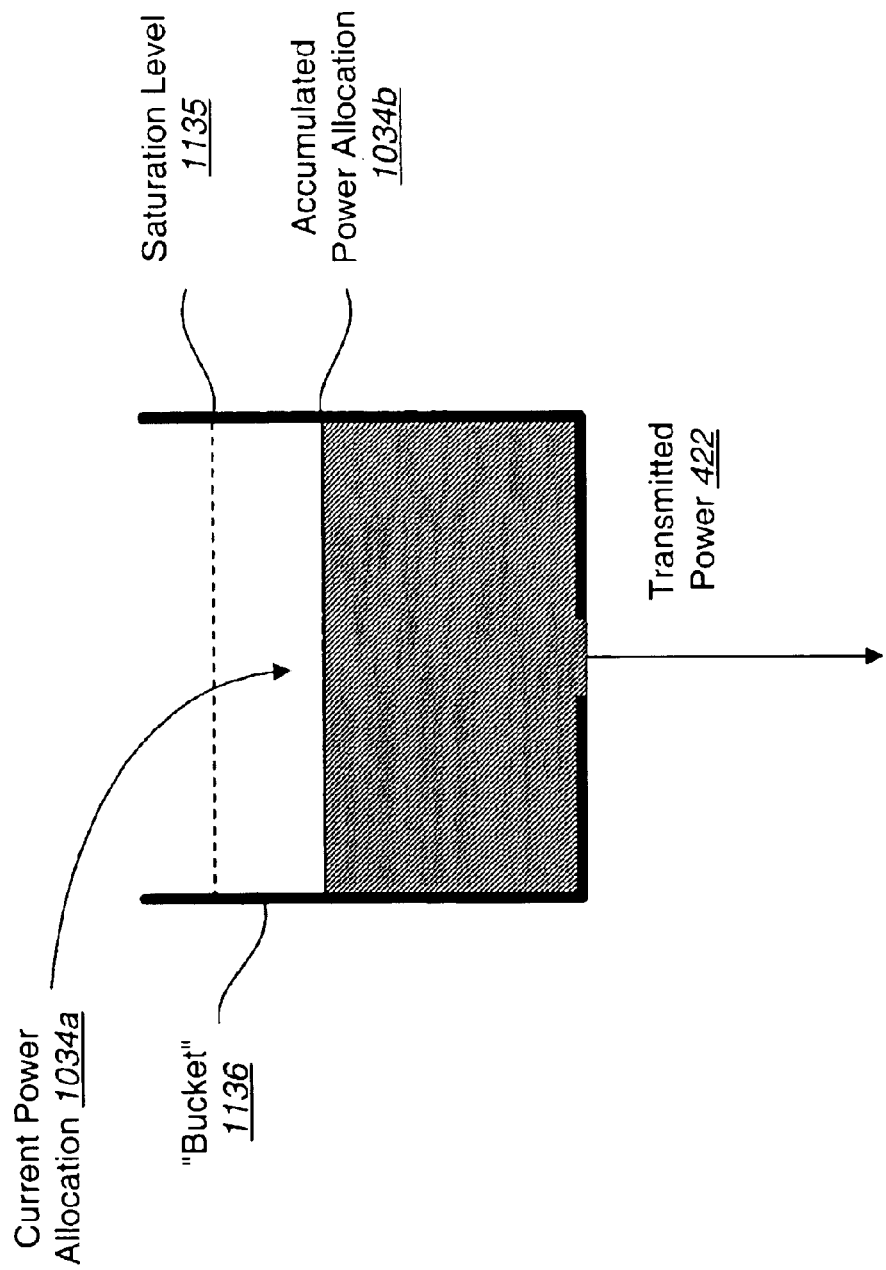
FIG. 11 illustrates an exemplary mechanism that may be used to determine the total available power for an access terminal.

FIG. 11 illustrates an exemplary mechanism that may be used to determine the total available power 1034 for an AT 206. The mechanism involves the use of a virtual "bucket" 1136. At periodic intervals, a new current power allocation 1034a is added to the bucket 1136. Also at periodic intervals, the power level 422 of the packets 524 transmitted by the AT 206 exits the bucket 1136. The amount by which the current power allocation 1034a exceeds the power level 422 of the packets is the accumulated power allocation 1034b. The accumulated power allocation 1034b remains in the bucket 1136 until it is used.

The total power available 1034 minus the current power allocation 1034a is the total potential withdrawal from the bucket 1136. The AT 1006 ensures that the power level 422 of the packets 524 that it transmits does not exceed the total available power 1034 for the AT 1006. As indicated previously, under some circumstances the total available power 1034 is less than the sum of the current power allocation 1034a and the accumulated power allocation 1034b. For example, the total available power 1034 may be limited by the peak power allocation 1034c.

The accumulated power allocation 1034b may be limited by a saturation level 1135. In some embodiments, the saturation level 1135 is a function of an amount of time that the AT 1006 is permitted to utilize its peak power allocation 1034c.

Figure 12:
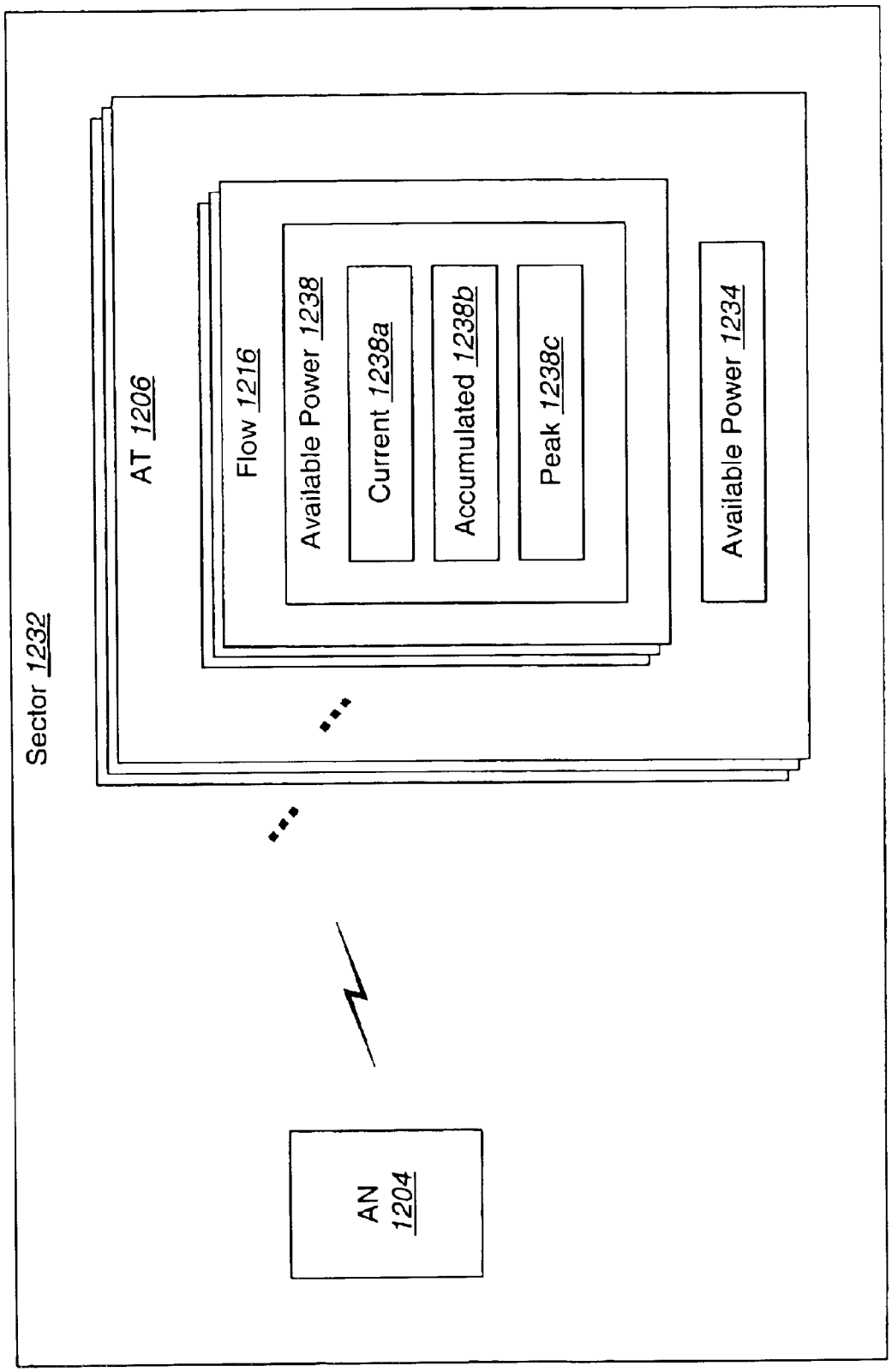
FIG. 12 is a block diagram illustrating an embodiment in which at least some of the access terminals within a sector include multiple flows.

FIG. 12 illustrates an embodiment in which at least some of the ATs 1206 within a sector 1232 include multiple flows 1216. In such an embodiment, a separate amount of available power 1238 may be determined for each flow 1216 on the AT 1206. The power available 1238 for a flow 1216 on the AT 1206 may be determined in accordance with the methods described previously in connection with FIGS. 10-11. More specifically, the total available power 1238 for a flow 1216 may include a current power allocation 1238a for the flow 1216 plus at least some portion of an accumulated power allocation 1238b for the flow 1216. In addition, the total available power 1238 for a flow 1216 may be limited by a peak allocation 1238c for the flow 1216. A separate bucket mechanism, such as that shown in FIG. 11, may be maintained for each flow 1216 in order to determine the total available power 1238 for each flow 1216. The total available power 1234 for the AT 1206 may be determined by taking the sum of the total available power 1238 for the different flows 1216 on the AT 1206.

The following provides a mathematical description of various formulas and algorithms that may be used in the determination of the total available power 1238 for a flow 1216 on the AT 1206. In the equations described below, the total available power 1238 for each flow i on the AT 1206 is determined once every sub-frame. (In some embodiments, a sub-frame is equal to four time slots, and a time slot is equal to 5/3 ms.) The total available power 1238 for a flow is referred to in the equations as PotentialT2POutflow.

The total available power 1238 for flow i transmitted in a high capacity packet 524a may be expressed as:

$$PotentialT2POutflow_{i,HC} = \qquad (1)$$
$$\max\left(0, \min\left(\begin{array}{l}(1 + AllocationStagger \times r_n) \times \left(\left(\dfrac{BucketLevel_{i,n}}{4}\right) + T2PInflow_{i,n}\right), \\ BucketFactor(T2PInflow_{i,n}, FRAB_{i,n}) \times T2PInflow_{i,n}\end{array}\right)\right)$$

The total available power 1238 for flow i transmitted in a low latency packet 524b may be expressed as:

$$PotentialT2Outflow_{i,LL} = \max\left(0, \min\left(\begin{array}{c}(1 + AllocationStagger \times r_n) \times \left(\left(\frac{BucketLevel_{i,n}}{2}\right) + T2PInflow_{i,n}\right), \\ BucketFactor(T2PInflow_{i,n}, FRAB_{i,n}) \times T2PInflow_{i,n}\end{array}\right)\right) \quad (2)$$

BucketLevel$_{i,n}$ is the accumulated power allocation 1238b for flow i at sub-frame n. T2PInflow$_{i,n}$ is the current power allocation 1238a for flow i at sub-frame n. The expression BucketFactor(T2PInflow$_{i,n}$, FRAB$_{i,n}$)×T2PInflow$_{i,n}$ is the peak power allocation 1238c for flow i at sub-frame n. BucketFactor(T2PInflow$_{i,n}$, FRAB$_{i,n}$) is a function for determining the limiting factor for the total available power 1238, i.e. the factor by which the total available power 1238 for flow i at sub-frame n is permitted to exceed the current power allocation 1238a for flow i at sub-frame n. FRAB$_{i,n}$ is an estimate of the loading level of the sector 1232, and will be discussed in greater detail below. AllocationStagger is the amplitude of a random term that dithers allocation levels, to avoid synchronization problems, and r$_n$ is a real-valued uniformly distributed random number in the range [−1,1].

The accumulated power allocation 1238b for flow i at sub-frame n+1 may be expressed as:

BucketLevel$_{i,n+1}$=min((BucketLevel$_{i,n}$+T2PInflow$_{i,n}$−T2POutflow$_{i,n}$), BucketLevelSat$_{i,n+1}$)  (3)

T2POutflow$_{i,n}$ is the portion of the transmitted power 422 that is apportioned to flow i at sub-frame n. An exemplary equation for T2POutflow$_{i,n}$ is provided below. BucketLevelSat$_{i,n+1}$ is the saturation level 1135 for the accumulated power allocation 1238b for flow i at sub-frame n+1. An exemplary equation for BucketLevelSat$_{i,n+1}$ is provided below.

T2POutflow$_{i,n}$ may be expressed as:

$$T2POutflow_{i,n} = \left(\frac{d_{i,n}}{SumPayload_n}\right) \times TxT2P_n \quad (4)$$

In equation 4, d$_{i,n}$ is the amount of data from flow i that is included in the sub-packet that is transmitted during sub-frame n. (A sub-packet is the portion of a packet that is transmitted during a sub-frame.) SumPayload$_n$ is the sum of d$_{i,n}$. TxT2P$_n$ is the power level 422 of the sub-packet that is transmitted during sub-frame n.

BucketLevelSat$_{i,n+1}$ may be expressed as:

BucketLevelSat$_{i,n+1}$=BurstDurationFactor$_i$× BucketFactor(T2PInflow$_{i,n}$,FRAB$_{i,n}$)×T2PInflow$_{i,n}$  (5)

BurstDurationFactor$_i$ is a limitation on the length of time that flow i is permitted to transmit at the peak power allocation 1238c.

Figure 13:
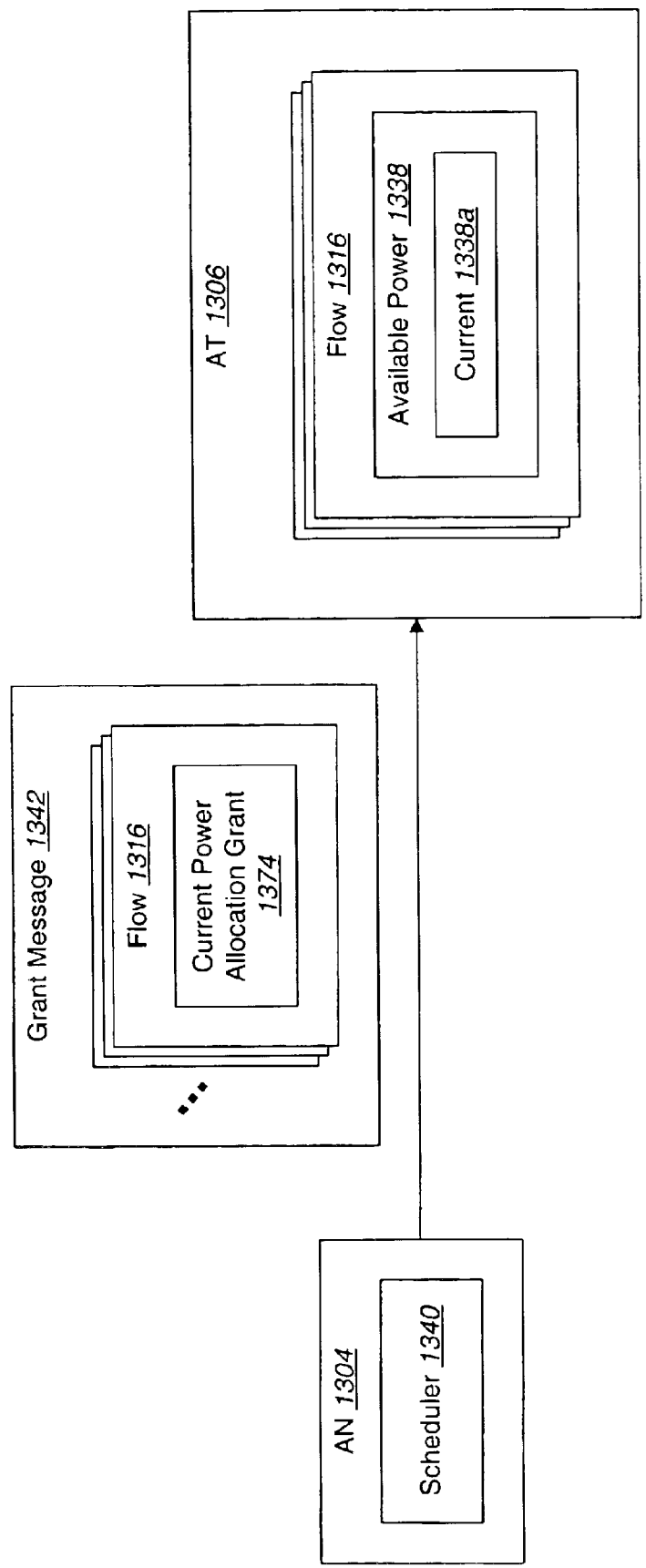
FIG. 13 is a block diagram illustrating one way in which the access terminal may obtain the current power allocation for the flows on the access terminal.

FIG. 13 illustrates one way in which the AT 1306 may obtain the current power allocation 1338a for the flows 1316 on the AT 1306. As shown, the AT 1306 may receive a grant message 1342 from a scheduler 1340 that is running on the AN 1304. The grant message 1342 may include a current power allocation grant 1374 for some or all of the flows 1316 on the AT 1306. For each current power allocation grant 1374 that is received, the AT 1306 sets the current power allocation 1338a for the corresponding flow 1316 equal to the current power allocation grant 1374.

In some embodiments, obtaining the current power allocation 1338a is a two-step process. The first step involves determining whether a current power allocation grant 1374 for a flow 1316 has been received from the AN 1304. If not, then the AT 1306 autonomously determines the current power allocation 1338a for the flow 1216. In other words, the AT 1306 determines the current power allocation 1338a for the flow 1216 without intervention from the scheduler 1340. The following discussion relates to exemplary methods for the AT 1306 to autonomously determine the current power allocation 1338a for one or more flows 1316 on the AT 1306.

Figure 14:
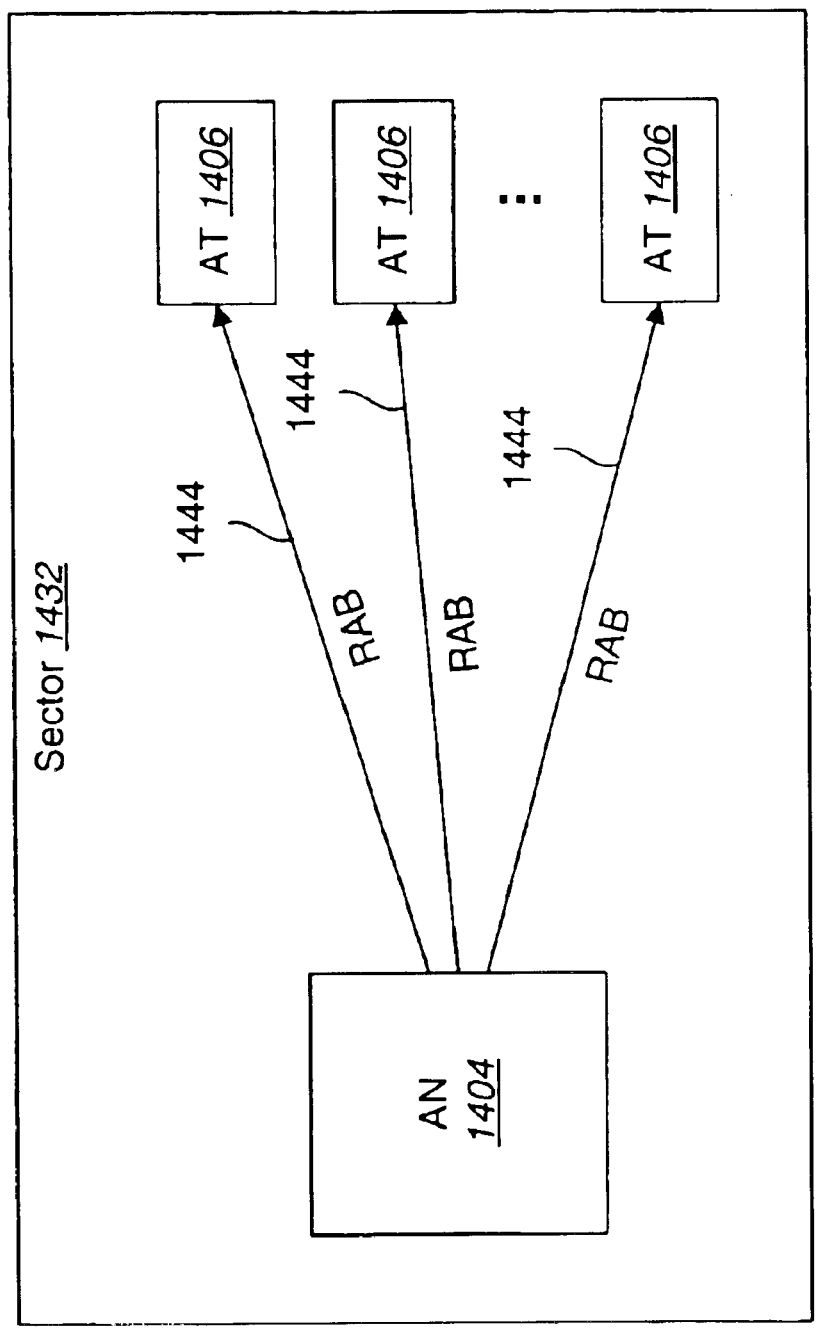
FIG. 14 is a block diagram illustrating a reverse activity bit being transmitted from the access network to the access terminals within a sector.

FIG. 14 illustrates a reverse activity bit (RAB) 1444 being transmitted from the AN 1404 to the ATs 1406 within a sector 1432. The RAB 1444 is an overload indication. The RAB 1444 may be one of two values, a first value (e.g., +1) which indicates that the sector 1432 is presently busy, or a second value (e.g., −1) which indicates that the sector 1432 is presently idle. As will be explained below, the RAB 1444 may be used to determine the current power allocations 1238a for the flows 1216 on the AT 1206.

Figure 15:
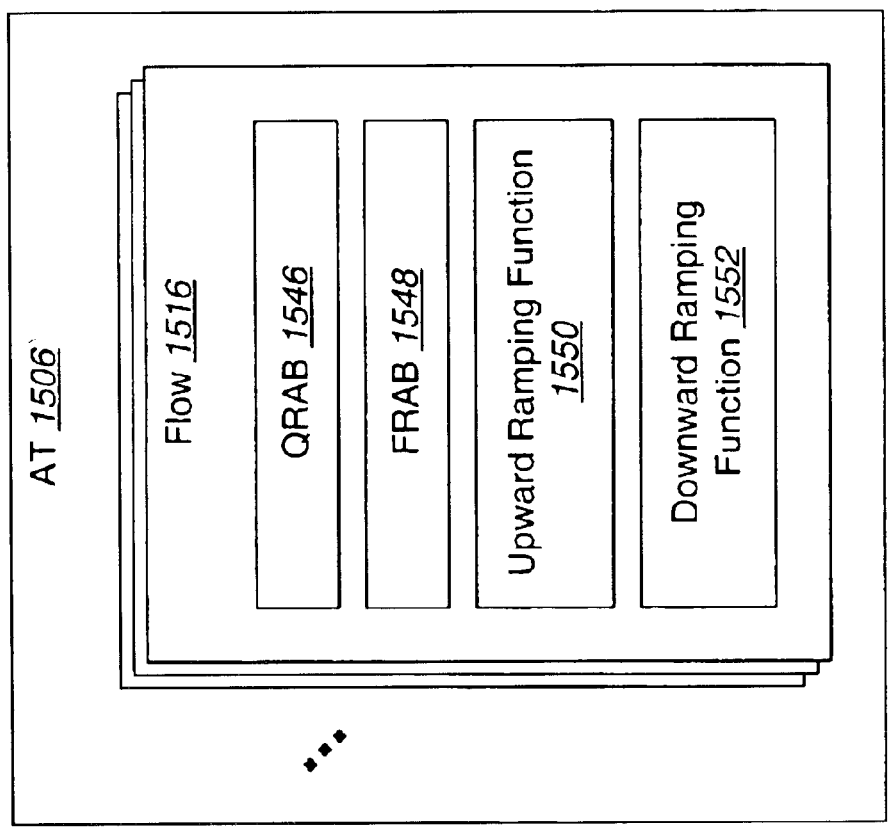
FIG. 15 is a block diagram illustrating information that may be maintained at the access terminal in order to determine the current power allocation for one or more flows on the access terminal.

FIG. 15 illustrates information that may be maintained at the AT 1506 in order to determine the current power allocation 1238a for one or more flows 1516 on the AT 1506. In the illustrated embodiment, each flow 1516 is associated with a "quick" estimate of the RAB 1444. This quick estimate will be referred to herein as QRAB 1546. An exemplary method for determining QRAB 1546 will be described below.

Each flow 1516 is also associated with an estimate of the longer-term loading level of the sector 1232, referred to herein as FRAB 1548 (which stands for "filtered" RAB 1444). FRAB 1548 is a real number that lies somewhere between the two possible values of the RAB 1444. The closer FRAB 1548 comes to the value of RAB 1444 which indicates that the sector 1432 is busy, the more heavily loaded the sector 1432 is. Conversely, the closer FRAB 1548 comes to the value of the RAB 1444 which indicates the sector 1432 is idle, the less heavily loaded the sector 1432 is. An exemplary method for determining FRAB 1548 will be described below.

Each flow 1516 is also associated with an upward ramping function 1550 and a downward ramping function 1552. The upward ramping function 1550 and the downward ramping function 1552 associated with a particular flow 1516 are functions of the current power allocation 1238a for the flow 1516. The upward ramping function 1550 associated with a flow 1516 is used to determine an increase in the current power allocation 1238a for the flow 1516.

Conversely, the downward ramping function 1552 associated with a flow 1516 is used to determine a decrease in the current power allocation 1238a for the flow 1516. In some embodiments, both the upward ramping function 1550 and the downward ramping function 1552 depend on the value of FRAB 1548 and the current power allocation 1238a for the flow 1516.

The upward ramping function 1550 and the downward ramping function 1552 are defined for each flow 1516 in the network, and are downloadable from the AN 1404 controlling the flow's AT 1506. The upward ramping function and the downward ramping function have the flow's current power allocation 1238a as their argument. The upward ramping function 1550 will sometimes be referred to herein as gu, and the downward ramping function 1552 will sometimes be referred to herein as gd. We refer to the ratio of gu/gd (also a function of current power allocation 1238a) as a demand function. It may be demonstrated that, subject to data and access terminal power availability, the RLMac algorithm converges to a current power allocation 1238a for each flow 1516 such that all flow demand function values are equal when taken at their flow's allocation. Using this fact, by careful design of the flow demand functions it is possible to achieve the same general mapping of flow layout and requirements to resource allocation as any achievable by a centralized scheduler. But the demand function method achieves this general scheduling capability with minimal control signaling and in a purely decentralized manner.

Figure 16:
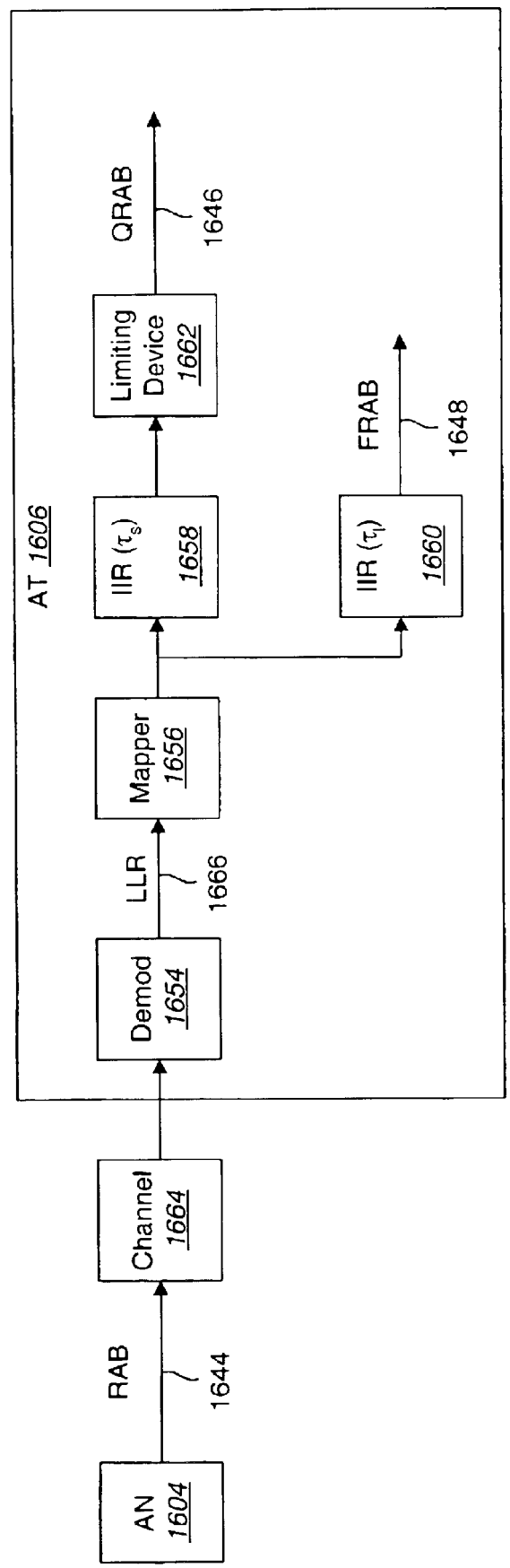
FIG. 16 is a functional block diagram illustrating exemplary functional components in an access terminal that may be used to determine an estimate of the reverse activity bit and an estimate of the current loading level of the sector.

FIG. 16 is a block diagram illustrating exemplary functional components in an AT 1606 that may be used to determine QRAB 1646 and FRAB 1648. As shown, the AT 1606 may include an RAB demodulation component 1654, a mapper 1656, first and second single-pole IIR filters 1658, 1660, and a limiting device 1662.

The RAB 1644 is transmitted from the AN 1604 to the AT 1606 across a communication channel 1664. The RAB demodulation component 1654 demodulates the received signal using standard techniques that are known to those skilled in the art. The RAB demodulation component 1654 outputs a log likelihood ratio (LLR) 1666. The mapper 1656 takes the LLR 1666 as input and maps the LLR 1666 to a value between the possible values of the RAB 1644 (e.g., +1 and −1), which is an estimate of the transmitted RAB for that slot.

The output of the mapper 1656 is provided to the first single-pole IIR filter 1658. The first IIR filter 1658 has a time constant TS. The output of the first IIR filter 1658 is provided to a limiting device 1662. The limiting device 1662 converts the output of the first IIR filter 1658 to one of two possible values, corresponding to the two possible values of the RAB 1644. For example, if the RAB 1644 was either a −1 or a +1, then the limiting device 1662 converts the output of the first IIR filter 1658 to either a −1 or a +1. The output of the limiting device 1662 is QRAB 1646. The time constant $\tau_s$ is chosen so that QRAB 1646 represents an estimate of what the current value of the RAB 1644 transmitted from the AN 1604 is. An exemplary value for the time constant $\tau_s$ is four time slots.

The output of the mapper 1656 is also provided to a second single-pole IIR filter 1660 having a time constant $\tau_l$. The output of the second IIR filter 1660 is FRAB 1648. The time constant $\tau_l$ is much longer than the time constant $\tau_s$. An exemplary value for the time constant $\tau_l$ is 384 time slots.

The output of the second IIR filter 1660 is not provided to a limiting device. Consequently, as described above, FRAB 1648 is a real number that lies somewhere between a first value of the RAB 1644 which indicates that the sector 1432 is busy and a second value of the RAB 1644 which indicates that the sector 1432 is idle.

Figure 17:
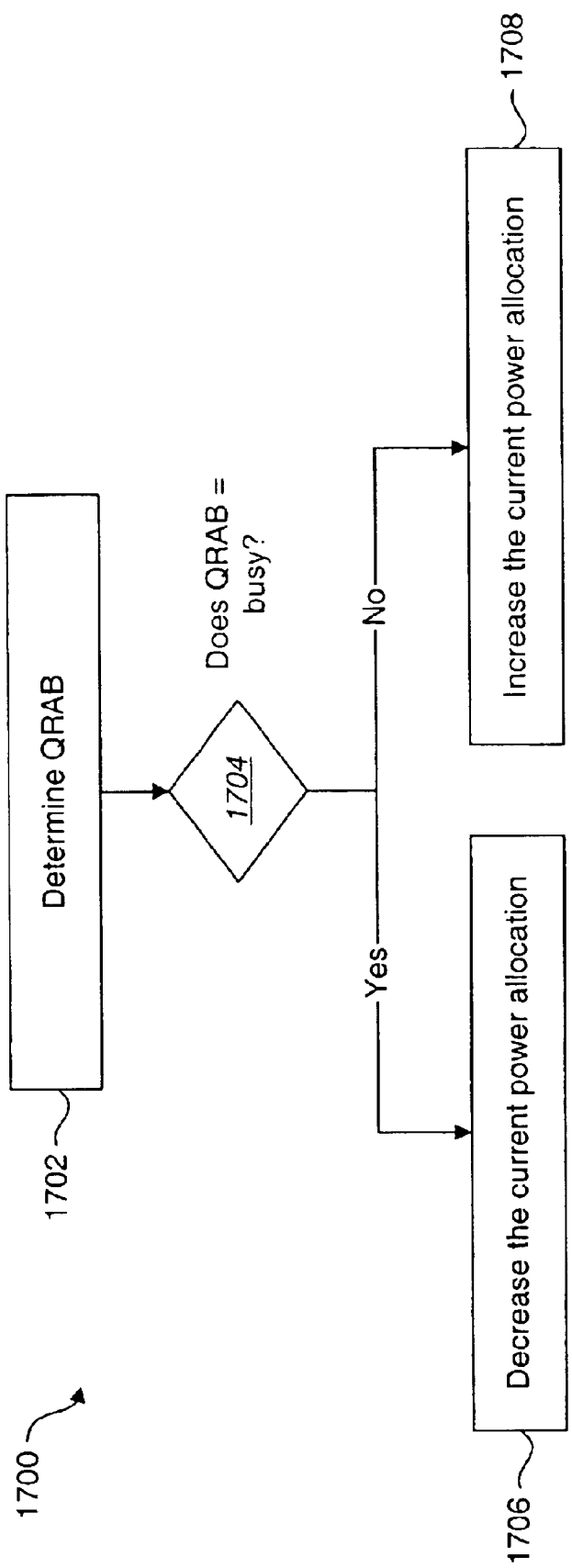
FIG. 17 is a flow diagram illustrating an exemplary method for determining the current power allocation for a flow on the access terminal.

FIG. 17 illustrates an exemplary method 1700 for determining the current power allocation 1238a for a flow 1216 on the AT 1206. Step 1702 of the method 1700 involves determining the value of QRAB 1546 that is associated with the flow 1216. In step 1704, it is determined whether QRAB 1546 is equal to a busy value (i.e., a value which indicates that the sector 1432 is presently busy). If QRAB 1546 is equal to a busy value, then in step 1706 the current power allocation 1238a is decreased, i.e., the current power allocation 1238a for the flow 1216 at time n is less than the current power allocation 1238a for the flow 1216 at time n−1. The magnitude of the decrease may be calculated using the downward ramping function 1552 that is defined for the flow 1216.

If QRAB 1546 is equal to an idle value, then in step 1708 the current power allocation 1238a is increased, i.e., the current power allocation 1238a for the flow 1216 during the current time interval is greater than the current power allocation 1238a for the flow 1216 during the most recent time interval. The magnitude of the increase may be calculated using the upward ramping function 1550 that is defined for the flow 1216.

The upward ramping function 1550 and the downward ramping function 1552 are functions of the current power allocation 1238a, and are potentially different for each flow 1516 (downloadable by the AN 1404). This is how QoS differentiation is achieved per-flow with autonomous allocation. Also, the value of the ramping function may vary with FRAB 1548, meaning that the dynamics of ramping may vary with loading, which allows for more rapid convergence to the fixed point under less loaded conditions.

Where the current power allocation 1238a is increased, the magnitude of the increase may be expressed as:

$$\Delta T2PInflow_{i,n} = +1 \times T2PUp_i(10 \times \log_{10}(T2PInflow_{i,n-1}) + \text{PilotStrength}_i(\text{PilotStrength}_{n,s}), FRAB_n) \quad (6)$$

Where the current power allocation 1238a is decreased, the magnitude of the decrease may be expressed as:

$$\Delta T2PInflow_{i,n} = -1 \times T2PDn_i(10 \times \log_{10}(T2PInflow_{i,n-1}) + \text{PilotStrength}_i(\text{PilotStrength}_{n,s}) FRAB_n) \quad (7)$$

$T2PUp_i$ is the upward ramping function 1550 for flow i. $T2PDn_i$ is the downward ramping function 1552 for flow i. $\text{PilotStrength}_{n,s}$ is a measure of the serving sector pilot power versus the pilot power of the other sectors. In some embodiments, it is the ratio of serving sector FL pilot power to the pilot power of the other sectors. $\text{PilotStrength}_i$ is a function mapping pilot strength to an offset in the T2P argument of the ramping function, and is downloadable from the AN. In this way, priority of the flows at an AT may be adjusted based on the AT's location in the network, as measured by the $\text{PilotStrength}_{n,s}$ variable.

The current power allocation 1238a may be expressed as:

$$T2PInflow_{i,n} = \left(1 - \left(\frac{1}{T2PFilterTC}\right)\right) \times T2PInflow_{i,n-1} + \left(\frac{1}{T2PFilterTC}\right) \times T2POutflow_{i,n-1} + \Delta T2PInflow_{i,n} \quad (8)$$

As can be seen from the foregoing equations, when the saturation level 1135 is reached and the ramping is set to zero, the current power allocation 1238a decays exponentially. This allows for persistence in the value of the current power allocation 1238a for bursty traffic sources, for which the persistence time should be longer than the typical packet interarrival time.

In some embodiments, a QRAB value 1546 is estimated for each sector in the active set of the AT 1206. If QRAB is busy for any of the sectors in the AT's active set, then the current power allocation 1238a is decreased. If QRAB is idle for all of the sectors in the AT's active set, then the current power allocation 1238a is increased. In alternative embodiments, another parameter QRABps may be defined. For QRABps, the measured pilot strength is taken into consideration. (The pilot strength is a measure of the serving sector pilot power versus the pilot power of the other sectors. In some embodiments, it is the ratio of serving sector FL pilot power to the pilot power of the other sectors.) QRABps is set to a busy value if QRAB is busy for a sector s that satisfies one or more of the following conditions: (1) sector s is the forward link serving sector for the access terminal; (2) the DRCLock bit from sector s is out-of-lock and PilotStrength$_{n,s}$ of sector s is greater than a threshold value; (3) the DRCLock bit from sector s is in-lock and PilotStrength$_{n,s}$ of sector s is greater than a threshold value. Otherwise, QRABps is set to an idle value. In embodiments where QRABps is determined, the current power allocation 1238a may be increased when QRABps is idle, and may be decreased when QRABps is busy.

Figure 18:
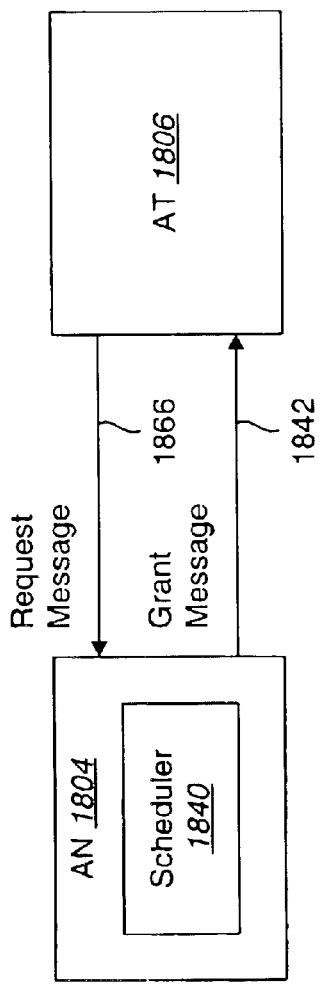
FIG. 18 is a block diagram illustrating an access terminal sending a request message to a scheduler on the access network.

FIG. 18 illustrates the AT 1806 sending a request message 1866 to the scheduler 1840 on the AN 1804. FIG. 18 also illustrates the scheduler 1840 sending a grant message 1842 to the AT 1806. In some embodiments, the scheduler 1840 may send grant messages 1842 to the AT 1806 on its own initiative. Alternatively, the scheduler 1840 may send grant messages 1842 to the AT 1806 in response to a request message 1866 that is sent by the AT 1806. A request message 1866 contains AT power headroom information as well as per-flow queue length information.

Figure 19:
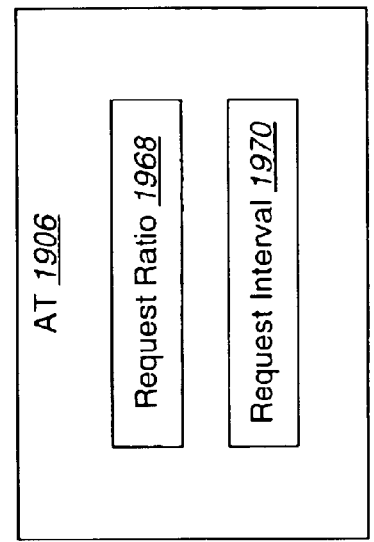
FIG. 19 is a block diagram illustrating information that may be maintained at the access terminal in order for the access terminal to determine when to send a request message to the access network.

FIG. 19 illustrates information that may be maintained at the AT 1906 in order for the AT 1906 to determine when to send a request message 1866 to the AN 1804. As shown, the AT 1906 may be associated with a request ratio 1968. The request ratio 1968 indicates the ratio of request message size 1866 sent on the reverse traffic channel 208 to data sent on the reverse traffic channel 208. In some embodiments, when the request ratio 1968 decreases below a certain threshold value, then the AT 1906 sends a request message 1866 to the scheduler 1840.

The AT 1906 may also be associated with a request interval 1970. The request interval 1970 indicates the period of time since the last request message 1866 was sent to the scheduler 1840. In some embodiments, when the request interval 1970 increases above a certain threshold value, then the AT 1906 sends a request message 1866 to the scheduler 1840. Both methods to trigger request messages 1866 may be used together as well (i.e., a request message 1866 may be sent when either method causes it).

Figure 20:
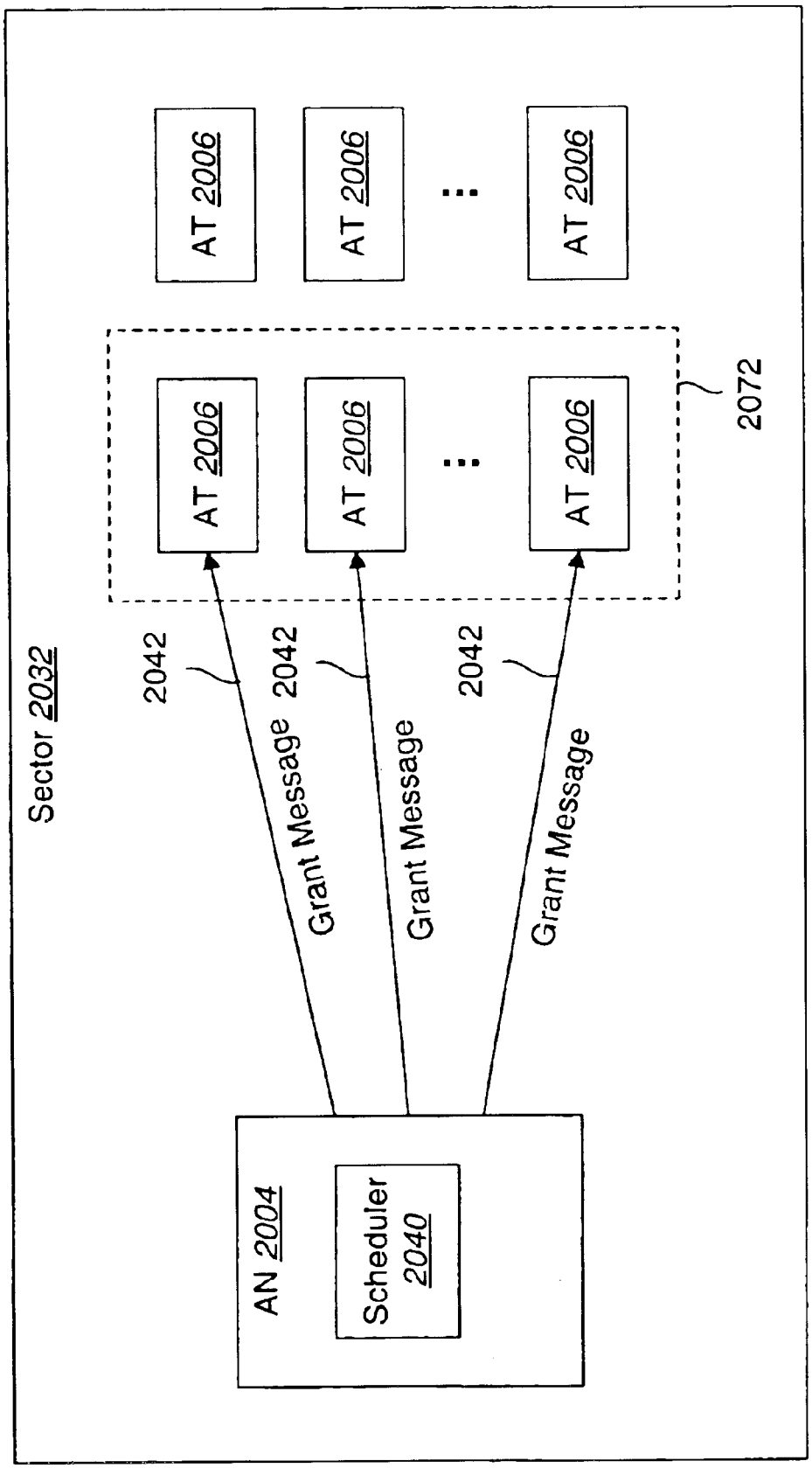
FIG. 20 is a block diagram illustrating an exemplary interaction between a scheduler running on the access network and the access terminals within the sector.

FIG. 20 illustrates an exemplary interaction between a scheduler 2040 running on the AN 2004 and the ATs 2006 within the sector 2032. As shown in FIG. 20, the scheduler 2040 may determine current power allocation grants 1374 for a subset 2072 of the ATs 2006 within the sector 2032. A separate current power allocation grant 1374 may be determined for each AT 2006. Where the ATs 2006 in the subset 2072 include more than one flow 1216, the scheduler 2040 may determine separate current power allocation grants 1374 for some or all of the flows 1216 on each AT 2006. The scheduler 2040 periodically sends grant messages 2042 to the ATs 2006 in the subset 2072. The scheduler 2040 does not determine current power allocations grants 1374 for the ATs 2006 within the sector 2032 that are not part of the subset 2072. Instead, the remaining ATs 2006 in the sector 2032 autonomously determine their own current power allocations 1038a. The grant messages 2042 may include a holding period for some or all of the current power allocation grants 1374. The holding period for a current power allocation grant 1374 indicates how long the AT 2006 keeps the current power allocation 1238a for the corresponding flow 1216 at the level specified by the current power allocation grant 1374.

In accordance with the approach illustrated in FIG. 20, the scheduler 2040 is not designed to fill all of the capacity in the sector 2032. Instead, the scheduler 2040 determines the current power allocations 1038a for the ATs 2006 within the subset 2072, and then the remaining sector 2032 capacity is used efficiently by the remaining ATs 2006 without intervention from the scheduler 2040. The subset 2072 may change over time, and may even change with each grant message 2042. Also, the decision to send a grant message 2042 to some subset 2072 of ATs 2006 may be triggered by any number of external events, including detection that some flows are not meeting certain QoS requirements.

Figure 21:
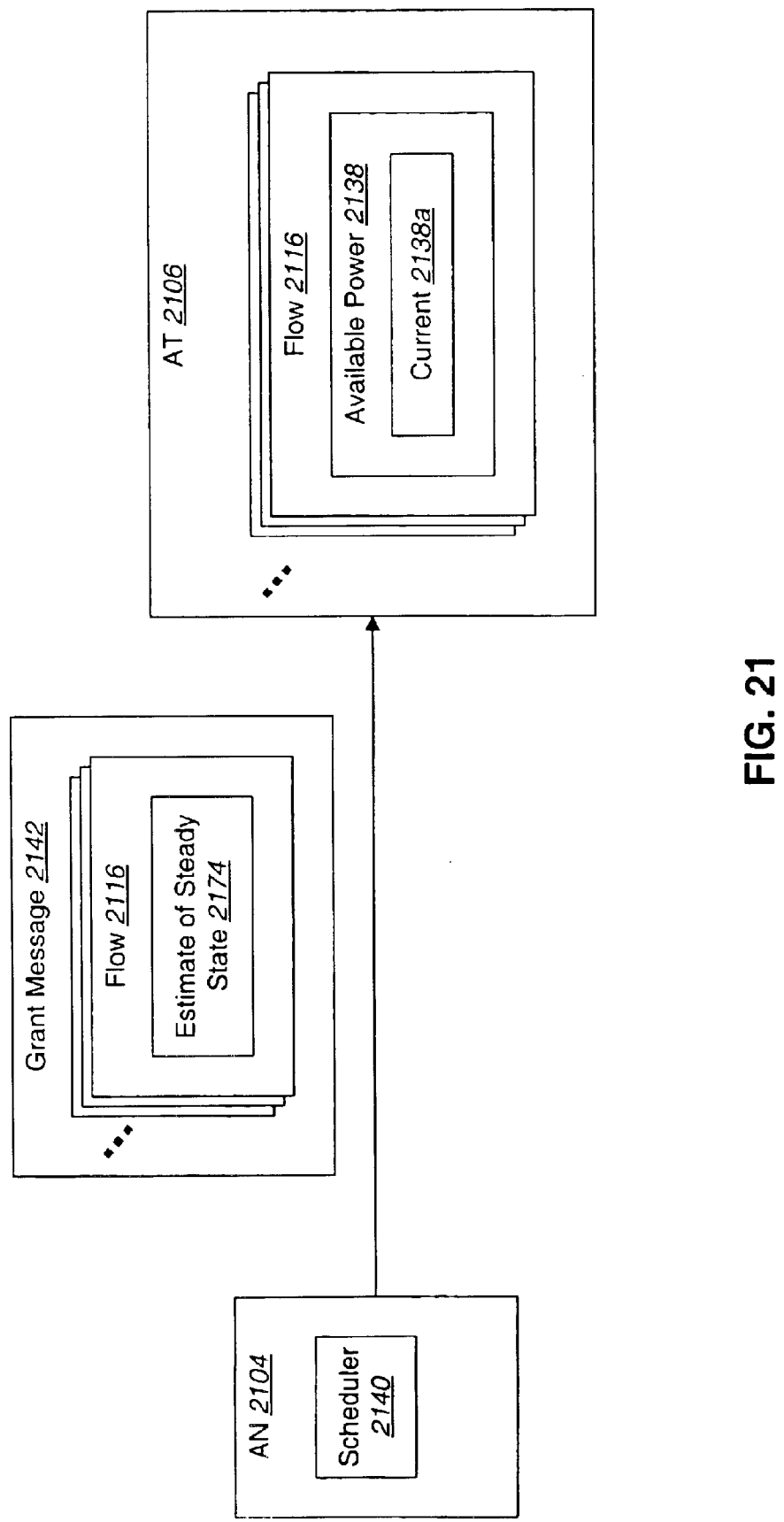
FIG. 21 is a block diagram illustrating another exemplary interaction between a scheduler running on the access network and an access terminal.

FIG. 21 illustrates another exemplary interaction between a scheduler 2140 running on the AN 2104 and an AT 2106. In some embodiments, if the AT 2106 is allowed to determine the current power allocations 2138a for the flows 2116 on the AT 2106, each of the current power allocations 2138a will, over time, converge to a steady-state value. For example, if one AT 2106 enters an unloaded sector 1232 with a flow 2116 that has data to transmit, the current power allocation 2138a for that flow 2116 will ramp up until that flow 2116 takes up the entire sector 2132 throughput. However, it may take some time for this to occur.

An alternative approach is for the scheduler 2140 to determine estimates of the steady-state values that the flows in each AT 2106 will ultimately reach. The scheduler 2140 may then send a grant message 2142 to all ATs 2106. In the grant message 2142, the current power allocation grant 2174 for a flow 2116 is set equal to the estimate of the steady-state value for that flow 2116, as determined by the scheduler 2140. Upon receiving the grant message 2142, the AT 2106 sets the current power allocations 2138a for the flows 2116 on the AT 2106 equal to the steady-state estimates 2174 in the grant message 2142. Once this is done, the AT 2106 may subsequently be allowed to track any changes in system conditions and autonomously determine the current power allocations 2138a for the flows 2116, without further intervention from the scheduler 2140.

Figure 22:
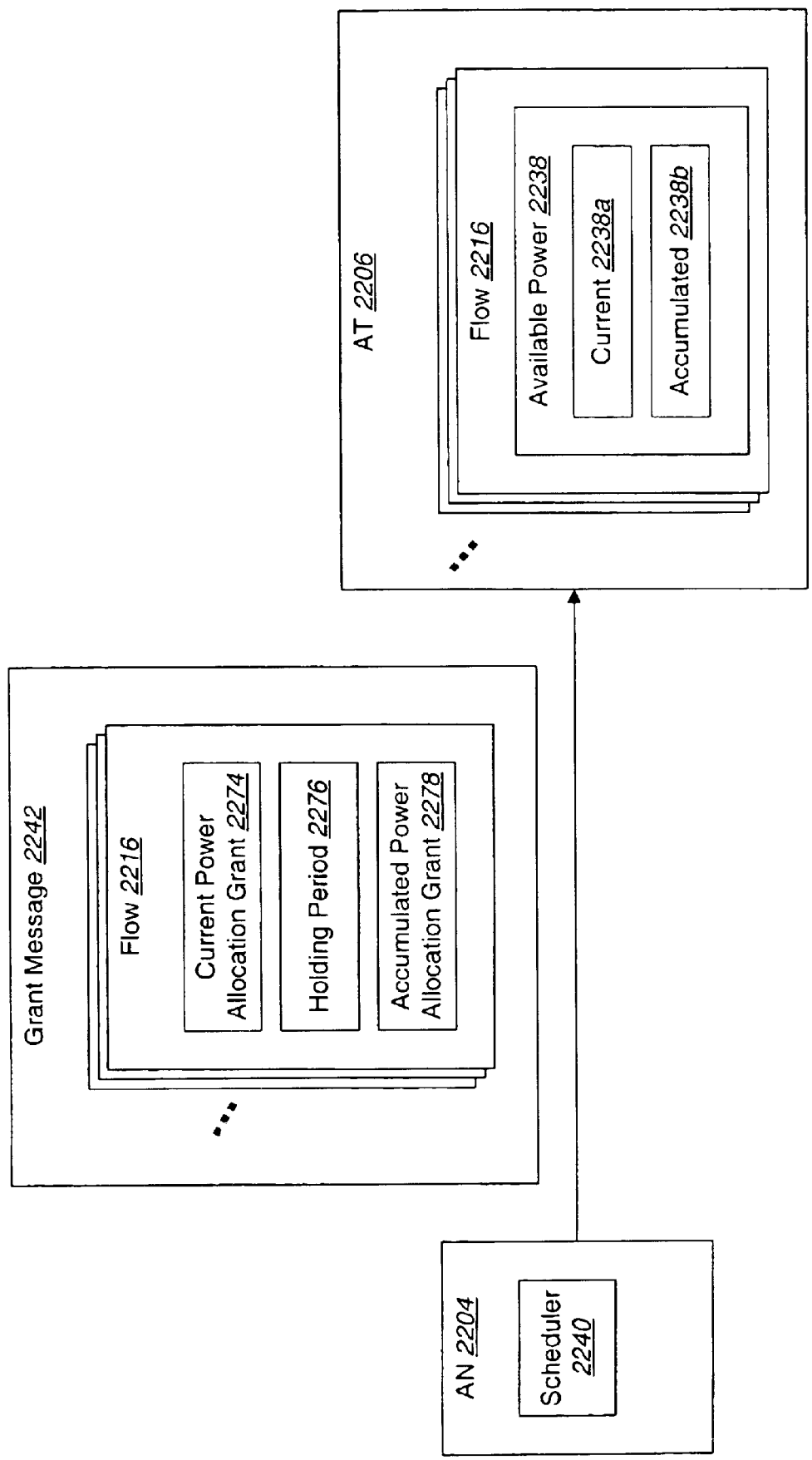
FIG. 22 is a block diagram illustrating another embodiment of a grant message that is transmitted from the scheduler on the access network to the access terminal.

FIG. 22 illustrates another embodiment of a grant message 2242 that is transmitted from the scheduler 2240 on the AN 2204 to the AT 2206. As before, the grant message 2242 includes a current power allocation grant 2274 for one or more of the flows 2216 on the AT 2206. In addition, the grant message includes a holding period 2276 for some or all of the current power allocation grants 2274.

The grant message 2242 also includes an accumulated power allocation grant 2278 for some or all of the flows 2216 on the AT 2206. Upon receiving the grant message 2242, the AT 2206 sets the accumulated power allocations 2238b for the flows 2216 on the AT 2206 equal to the accumulated power allocation grants 2278 for the corresponding flows 2216 in the grant message 2242.

Figure 23:
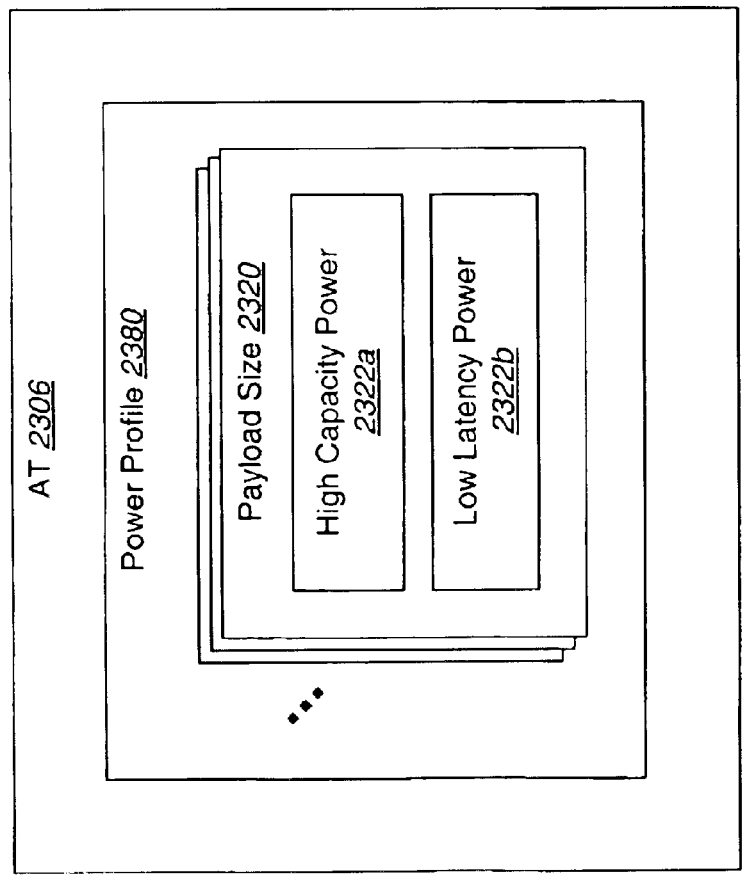
FIG. 23 is a block diagram illustrating a power profile that may be stored at the access terminal.

FIG. 23 illustrates a power profile 2380 that may be stored at the AT 2306, in some embodiments. The power profile 2332 may be used to determine the payload size 420 and the power level 422 of a packet that is transmitted by the AT 2306 to the AN 204.

The power profile 2380 includes a plurality of payload sizes 2320. The payload sizes 2320 included in the power profile 2380 are the possible payload sizes 2320 for the packets 524 that are transmitted by the AT 2306.

Each payload size 2320 in the power profile 2380 is associated with a power level 2322 for each possible transmission mode. In the illustrated embodiment, each payload size 2320 is associated with a high capacity power level 2322a and a low latency power level 2322b. The high capacity power level 2322a is the power level for a high capacity packet 524a with the corresponding payload size 2320. The low latency power level 2322b is the power level for a low latency packet 524b with the corresponding payload size 2320.

Figure 24:
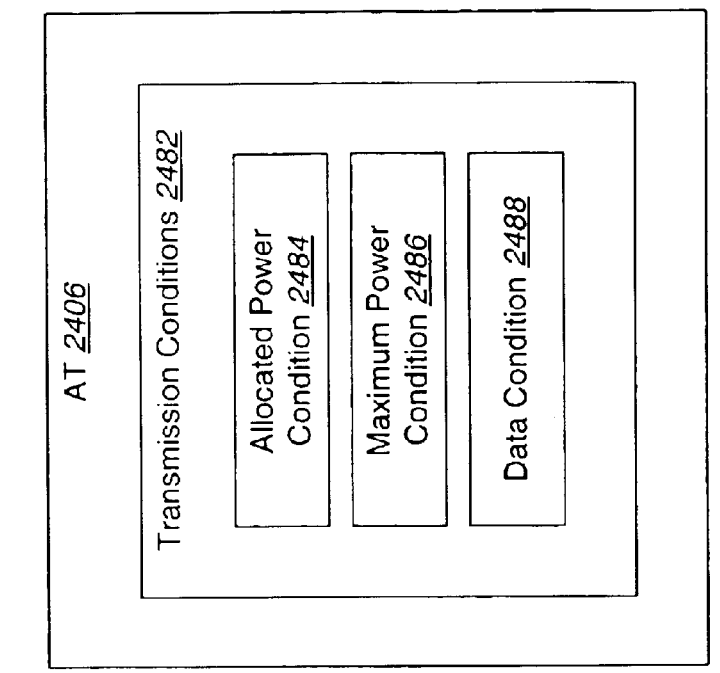
FIG. 24 is a block diagram illustrating a plurality of transmission conditions that may be stored at the access terminal.

FIG. 24 illustrates a plurality of transmission conditions 2482 that may be stored at the AT 2406. In some embodiments, the transmission conditions 2482 influence the selection of the payload size 420 and the power level 422 for a packet 524.

The transmission conditions 2482 include an allocated power condition 2484. The allocated power condition 2484 relates generally to ensuring that the AT 2406 is not using more power than it has been allocated. More specifically, the allocated power condition 2484 is that the power level 422 of the packet 524 does not exceed the total available power 1034 for the AT 2406. Various exemplary methods for determining the total available power 1034 for the AT 2406 were discussed above.

The transmission conditions 2482 also include a maximum power condition 2486. The maximum power condition 2486 is that the power level 422 of the packet 524 does not exceed a maximum power level that has been specified for the AT 2406.

The transmission conditions 2482 also include a data condition 2488. The data condition 2488 relates generally to ensuring that the payload size 420 of the packet 524 is not too large in view of the total available power 1034 of the AT 2406 as well as the amount of data that the AT 2406 presently has available for transmission. More specifically, the data condition 2488 is that there is not a payload size 2320 in the power profile 2380 that corresponds to a lower power level 2322 for the transmission mode of the packet 524 and that is capable of carrying the lesser of (1) the amount of data that is presently available for transmission, and (2) the amount of data that the total available power 1034 for the AT 2406 corresponds to.

The following provides a mathematical description of the transmission conditions 2482. The allocated power condition 2484 may be expressed as:

$$TxT2PNominal_{PS,TM} \leq \sum_{i \in F}(PotentialT2POutflow_{i,TM}) \quad (9)$$

$TxT2PNominal_{PS,TM}$ is the power level 2322 for payload size PS and transmission mode TM. F is the flow set 418.

The maximum power condition 2486 may be expressed as:

$$\max(TxT2PPreTransition_{PS,TM}, TxT2PPostTransition_{PS,TM}) \leq TxT2P\max \quad (10)$$

In some embodiments, the power level 422 of a packet 524 is permitted to transition from a first value to a second value at some point during the transmission of the packet 524. In such embodiments, the power level 2322 that is specified in the power profile 2380 includes a pre-transition value and a post-transition value. $TxT2PPreTransition_{PS,TM}$ is the pre-transition value for payload size PS and transmission mode TM. $TxT2PPostTransition_{PS,TM}$ is the post-transition value for payload size PS and transmission mode TM. TxT2P max is a maximum power level that is defined for the AT 206, and may be a function of the PilotStrength measured by the AT 206. PilotStrength is a measure of the serving sector pilot power versus the pilot power of the other sectors. In some embodiments, it is the ratio of serving sector FL pilot power to the pilot power of the other sectors. It may also be used to control the up and down ramping that the AT 206 performs autonomously. It may also be used to control TxT2P max, so that ATs 206 in poor geometries (e.g. at the edge of sectors) may restrict their maximum transmit power, to avoid creating unwanted interference in other sectors.

In some embodiments, the data condition 2488 is that there is not a payload size 2320 in the power profile 2380 that corresponds to a lower power level 2322 for the transmission mode of the packet 524 and that is capable of carrying a payload of size given by:

$$\sum_{i \in F}\min(d_{i,n}, T2PConversionFactor_{TM} \times PotentialT2POutflow_{i,TM}) \quad (11)$$

In equation 11, $d_{i,n}$ is the amount of data from flow i that is included in the sub-packet that is transmitted during sub-frame n. The expression $T2PConversionFactor_{TM} \times PotentialT2POutflow_{i,TM}$ is the transmittable data for flow i, i.e., the amount of data that the total available power 1034 for the AT 2406 corresponds to. $T2PConversionFactor_{TM}$ is a conversion factor for converting the total available power 1238 for flow i into a data level.

Figure 25:
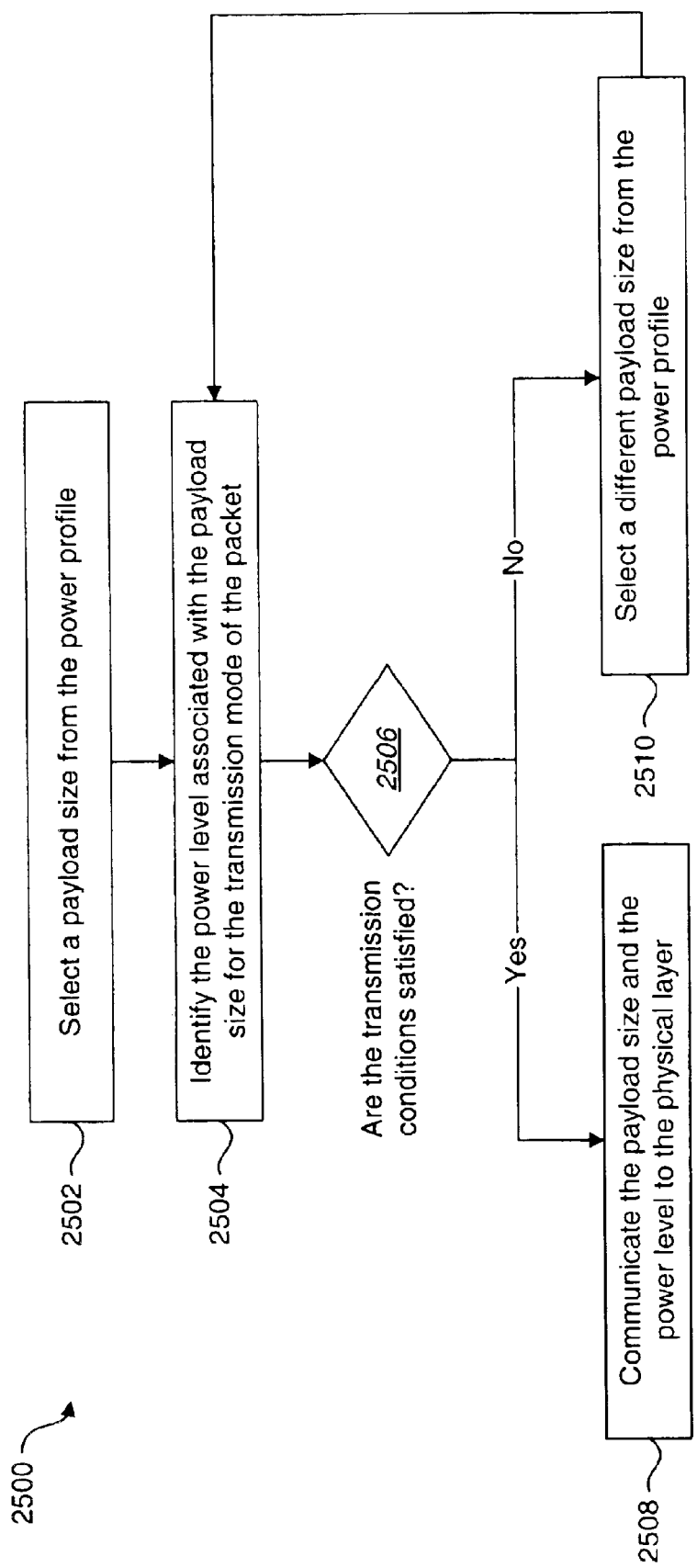
FIG. 25 is a flow diagram illustrating an exemplary method that the access terminal may perform in order to determine the payload size and the power level for a packet.

FIG. 25 illustrates an exemplary method 2500 that the AT 206 may perform in order to determine the payload size 420 and the power level 422 for a packet 524. Step 2502 involves selecting a payload size 2320 from the power profile 2380. Step 2504 involves identifying the power level 2322 associated with the selected payload size 2320 for the transmission mode of the packet 524. For example, if the packet 524 is going to be transmitted in high capacity mode, then step 2504 involves identifying the high capacity power level 2322a associated with the selected payload size 2320. Conversely, if the packet is going to be transmitted in low latency mode, then step 2504 involves identifying the low latency power level 2322b associated with the selected payload size 2320.

Step 2506 involves determining whether the transmission conditions 2482 are satisfied if the packet 524 is transmitted with the selected payload size 2320 and the corresponding power level 2322. If in step 2506 it is determined that the transmission conditions 2482 are satisfied, then in step 2508 the selected payload size 2320 and the corresponding power level 2322 are communicated to the physical layer 312.

If in step 2506 it is determined that the transmission conditions 2482 are not satisfied, then in step 2510 a different payload size 2320 is selected from the power profile 2380. The method 2500 then returns to step 2504 and proceeds as described above.

The design philosophy behind multiflow allocation is that the total power available is equal to the sum of the power available for each flow in the access terminal. This method works well up to the point that the access terminal itself runs out of transmit power, either due to hardware limits or due to TxT2P max limits. When transmit power is limited, further arbitration of flow power allocation in the access terminal is necessary. As discussed above, under no power limits the gu/gd demand function determines each flow's current power allocation through normal function of the RAB and flow ramping. Now when AT power is limited, one method to set flow allocation is to consider the AT power limit as strictly analogous to the sector power limit. Generally the sector has a max receive power criterion that is used to set the RAB, which then leads to each flow's power allocation. The idea is that when the AT is power limited, each flow in that AT is set to the power allocation that it would receive if the AT's power limit were actually the corresponding limit of the sector's received power. This flow power allocation may be determined directly from the gu/gd demand functions, either by running a virtual RAB inside the AT, or by other equivalent algorithms. In this way, intra-AT flow priority is maintained and is consistent with inter-AT flow priority. Further, no information beyond the existing gu and gd functions is necessary.

A summary of various features of some or all of the embodiments described herein will now be provided. The system allows for a decoupling of the mean resource allocation (T2PInflow) and how this resource is used for packet allocation (including control of peak rate and peak burst duration).

Packet allocation may remain autonomous in all cases. For mean resource allocation, either scheduled or autonomous allocation is possible. This allows seamless integration of scheduled and autonomous allocation, as the packet allocation process behaves the same in both cases, and means resource may be updated as often or not as desired.

Control of hold time in the grant message allows precise control of resource allocation timing with minimal signaling overhead.

BucketLevel control in the grant message allows for a quick injection of resource to a flow without affecting its mean allocation over time. This is a kind of 'one-time use' resource injection.

The scheduler may make an estimate of the 'fixed-point', or the proper resource allocation for each flow, and then download these values to each flow. This reduces the time for the network to get close to its proper allocation (a 'coarse' allocation), and then the autonomous mode rapidly achieves the ultimate allocation (the 'fine' allocation).

The scheduler may send grants to a subset of the flows, and allow the others to run autonomous allocation. In this way, resource guarantees may be made to certain key flows, and then the remaining flows then autonomously 'fill-in' the remaining capacity as appropriate.

The scheduler may implement a 'shepherding' function where transmission of a grant message only occurs when a flow is not meeting QoS requirements. Otherwise, the flow is allowed to autonomously set its own power allocation. In this way, QoS guarantees may be made with minimal signaling and overhead. Note that in order to achieve a QoS target for a flow, the shepherding scheduler may grant a power allocation different from the fixed-point solution of the autonomous allocations.

The AN may specify per-flow design of the ramping functions, up and down. By appropriate choice of these ramping functions, we may precisely specify any per-flow mean resource allocation with purely autonomous operation only, using only 1-bit of control information in each sector.

The very rapid timing implied in the QRAB design (updated every slot and filtered with a short time constant at each AT) allows for very tight control of each flow's power allocation, and maximizes overall sector capacity while maintaining stability and coverage.

Per-flow control of the peak power is allowed as a function of the mean power allocation and the sector loading (FRAB). This allows for trading off timeliness of bursty traffic with the effect on overall sector loading and stability.

Per-flow control of the max duration of transmission at the peak power rate is allowed, through the use of BurstDurationFactor. In conjunction with the peak rate control, this allows for control of sector stability and peak loading without central coordination of autonomous flow allocation, and allows for tuning requirements to specific source types.

Allocation to bursty sources is elegantly handled by the bucket mechanism and persistence of T2PInflow, which allows for mapping of the mean power allocation to bursty source arrivals while maintaining control of the mean power. The T2PInflow filter time constant controls the persistence time over which sporadic packet arrivals are allowed, and beyond which T2PInflow decays to a minimal allocation.

The dependence of T2PInflow ramping on FRAB allows for higher ramping dynamics in less loaded sectors, without affecting the final mean power allocation. In this way aggressive ramping may be implemented when a sector is less loaded, while good stability is maintained at high load levels by reducing ramping aggressiveness.

T2PInflow is self-tuning to the proper allocation for a given flow via autonomous operation, based on flow priority, data requirements, and available power. When a flow is over-allocated, the BucketLevel reaches the BucketLevelSat value, the up-ramping stops, and the T2PInflow value will decay down to the level at which BucketLevel is less than BucketLevelSat. This is then the appropriate allocation for T2PInflow.

Besides the per-flow QoS differentiation available in autonomous allocation based on up/down ramping function design, it is also possible to control flow power allocation based on channel conditions, via QRAB or QRABps and the dependency of ramping on PilotStrength. In this way flows in poor channel conditions may get lower allocation, reducing interference and improving the overall capacity of the system, or may get full allocation independent of channel condition, which maintains uniform behavior at the expense of system capacity. This allows control of the fairness/general welfare tradeoff.

As far as possible, both inter-AT and intra-AT power allocation for each flow is as location-independent as possible. This means that it doesn't matter what other flows are at the same AT or other AT's, a flow's allocation only depends on the total sector loading. Some physical facts limit how well this goal may be attained, particularly the max AT transmit power, and issues about merging HiCap and LoLat flows.

In keeping with this approach, the total power available for an AT packet allocation is the sum of the power available to each flow in the AT, subject to the AT's transmit power limitation.

Whatever rule is used to determine data allocation from each flow included in a packet allocation, we keep precise accounting of the flow's resource usage in terms of bucket withdrawal. In this way, inter-flow fairness is guaranteed for any data allocation rule.

When the AT is power limited and can't accommodate the aggregate power available to all its flows, power is used from each flow appropriate to the lesser power available within the AT. That is, the flows within the AT maintain the proper priority relative to each other, as though they were sharing a sector with just those AT's and that max power level (the AT power limit is analogous to the power limit of the sector as a whole). The power remaining in the sector not used up by the power-limited AT is then available for the other flows in the sector as usual.

High capacity flows ca may be merged into low latency transmissions when the sum of high capacity potential data usage in one AT is high enough that not merging would lead to a large power differential across packets. This maintains smoothness in transmitted power appropriate to a self-interfering system. High capacity flows may be merged into low latency transmissions when a specific high capacity flow has delay requirements such that it can't wait for all low latency flows in the same AT to transmit, then upon reaching a threshold of potential data usage, the flow may merge its data into low latency transmissions. Thus delay requirements for high capacity flows may be met when sharing an AT with persistent low latency flows. High capacity flows may be merged into low latency transmissions when a sector is lightly loaded, the efficiency loss in sending high capacity flows as low latency is not important, and hence merging may always be allowed.

A set of high capacity flows may be transmitted in low latency mode even if there are no active low latency flows, when the packet size for high capacity mode would be at least PayloadThresh in size. This allows for high capacity mode flows to achieve the highest throughput when their power allocation is high enough, as the highest throughput for an AT occurs at the largest packet size and low latency transmission mode. To say it another way, the peak rate for high capacity transmission is much lower than that of low latency transmission, so a high capacity mode flow is allowed to use low latency transmission when it is appropriate that it achieves the highest throughput.

Each flow has a T2P max parameter which restricts its maximum power allocation. It may also be desirable to restrict an AT's aggregate transmit power, perhaps dependent on its location in the network (e.g. when at the boundary of two sectors an AT creates added interference and affects stability). The parameter TxT2P max may be designed to be a function of PilotStrength, and limits the AT's maximum transmit power.

Figure 26:
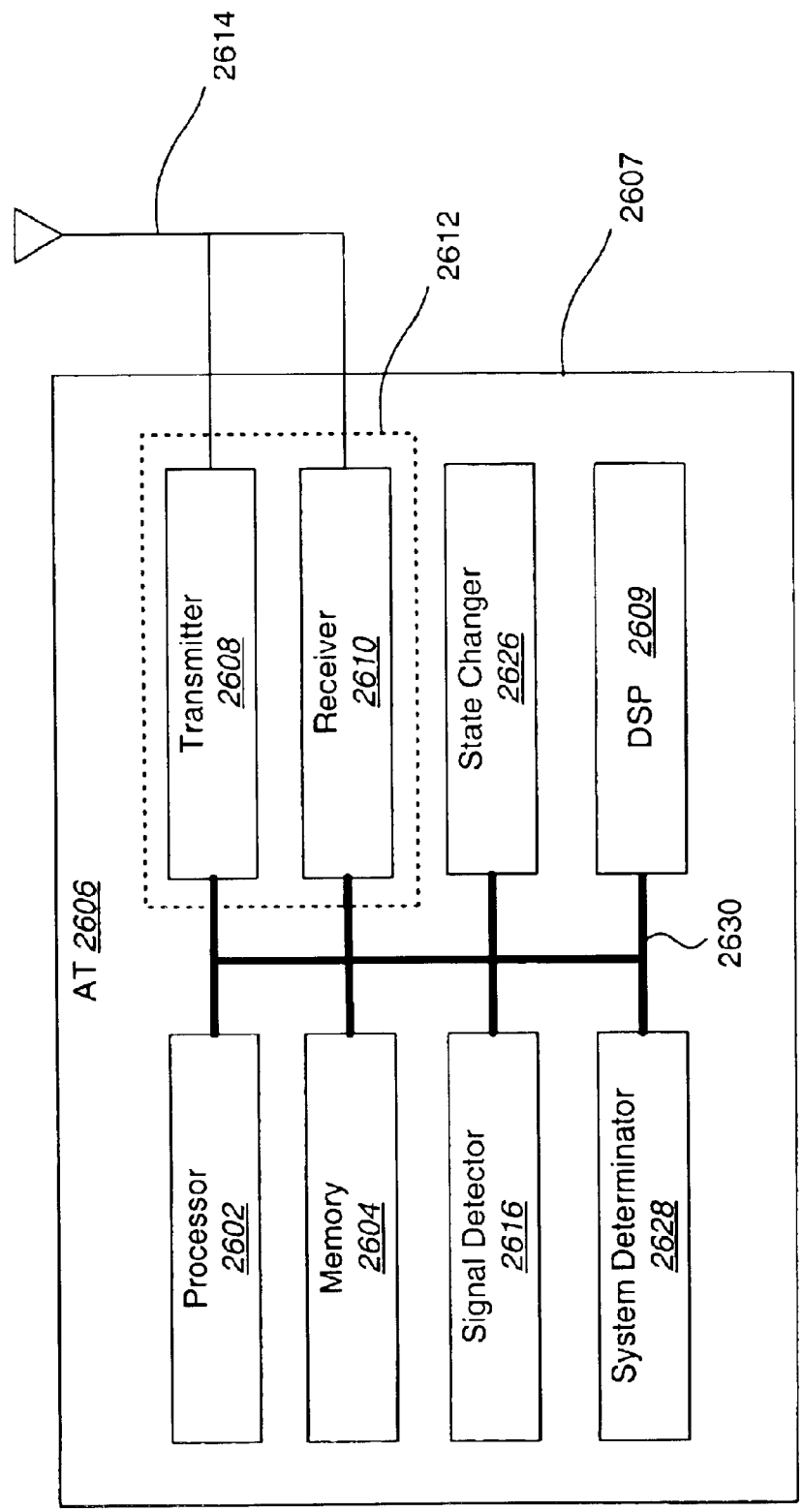
FIG. 26 is a functional block diagram illustrating an embodiment of an access terminal.

FIG. 26 is a functional block diagram illustrating an embodiment of an AT 2606. The AT 2606 includes a processor 2602 which controls operation of the AT 2606. The processor 2602 may also be referred to as a CPU. Memory 2604, which may include both read-only memory (ROM) and random access memory (RAM), provides instructions and data to the processor 2602. A portion of the memory 2604 may also include non-volatile random access memory (NVRAM).

The AT 2606, which may be embodied in a wireless communication device such as a cellular telephone, may also include a housing 2607 that contains a transmitter 2608 and a receiver 2610 to allow transmission and reception of data, such as audio communications, between the AT 2606 and a remote location, such as an AN 204. The transmitter 2608 and receiver 2610 may be combined into a transceiver 2612. An antenna 2614 is attached to the housing 2607 and electrically coupled to the transceiver 2612. Additional antennas (not shown) may also be used. The operation of the transmitter 2608, receiver 2610 and antenna 2614 is well known in the art and need not be described herein.

The AT 2606 also includes a signal detector 2616 used to detect and quantify the level of signals received by the transceiver 2612. The signal detector 2616 detects such signals as total energy, pilot energy per pseudonoise (PN) chips, power spectral density, and other signals, as is known in the art.

A state changer 2626 of the AT 2606 controls the state of the wireless communication device based on a current state and additional signals received by the transceiver 2612 and detected by the signal detector 2616. The wireless communication device is capable of operating in any one of a number of states.

The AT 2606 also includes a system determinator 2628 used to control the wireless communication device and determine which service provider system the wireless communication device should transfer to when it determines the current service provider system is inadequate.

The various components of the AT 2606 are coupled together by a bus system 2630 which may include a power bus, a control signal bus, and a status signal bus in addition to a data bus. However, for the sake of clarity, the various busses are illustrated in FIG. 26 as the bus system 2630. The AT 2606 may also include a digital signal processor (DSP) 2609 for use in processing signals. One skilled in the art will appreciate that the AT 2606 illustrated in FIG. 6 is a functional block diagram rather than a listing of specific components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal that is configured for wireless communication with an access network within a sector, comprising:
   a transmitter for transmitting a reverse traffic channel to the access network;
   an antenna for receiving signals from the access network;
   a processor;
   memory in electronic communication with the processor; and
   instructions stored in the memory, the instructions being executable to implement a method comprising:
      estimating a current value of a reverse activity bit transmitted by the access network;
      if the estimated current value of the reverse activity bit indicates that the sector is busy, decreasing a current power allocation for each flow of a plurality of flows on the access terminal, the magnitude of the decrease for a particular flow being determined according to a downward ramping function that is designed for the flow, the downward ramping function being a function of the current power allocation for the flow; and
      if the estimated current value of the reverse activity bit indicates that the sector is idle, increasing the current power allocation for each flow of the plurality of flows on the access terminal, the magnitude of the increase for a particular flow being determined according to an upward ramping function that is designed for the flow, the upward ramping function being a function of the current power allocation for the flow.

2. The access terminal of claim 1, wherein the estimating the current value of the reverse activity bit is performed once every slot.

3. The access terminal of claim 2, wherein the estimating comprises filtering a signal received from the access network with a filter having an adjustable time constant.

4. The access terminal of claim 1, wherein the method further comprises:
   estimating a loading level of the sector; and
   determining a peak power allocation for each flow of the plurality of flows, the peak power allocation for a particular flow being a function of the current power allocation for the flow and the estimate of the loading level of the sector.

5. The access terminal of claim 1, wherein the method further comprises, for each flow:
   determining an accumulated power allocation for the flow;
   using the current power allocation for the flow and the accumulated power allocation for the flow to determine a total available power for the flow; and
   using the total available power for the flow to determine a power level for a packet that is transmitted to the access network.

6. The access terminal of claim 5, wherein the accumulated power allocation for the flow is limited by a saturation level, the saturation level being a settable factor above a peak power allocation.

7. The access terminal of claim 1, wherein the downward ramping function and the upward ramping function are both dependent on an estimate of a loading level of the sector.

8. The access terminal of claim 1, wherein the downward ramping function and the upward ramping function are both dependent on a pilot strength measured by the access terminal.

9. The access terminal of claim 1, wherein the current power allocation is determined according to:

$$T2PInflow_{i,n} = \left(1 - \left(\frac{1}{T2PFilterTC}\right)\right) \times T2PInflow_{i,n-1} + \left(\frac{1}{T2PFilterTC}\right) \times T2POutflow_{i,n-1} + \Delta T2PInflow_{i,n}$$

wherein $T2PInflow_{i,n}$ is the current power allocation for flow i at sub-frame n, wherein T2PFilterTC is a filter time constant, wherein if the current power allocation is being increased $\Delta T2PInflow_{i,n}$ is expressed as:

$\Delta T2PInflow_{i,n} = +1 \times T2PUp_i(10 \times \log_{10}(T2PInflow_{i,n-1}) + PilotStrength_i(PilotStrength_{n,s}), FRAB_n)$ wherein if the current power allocation is being decreased $\Delta T2PInflow_{i,n}$ is expressed as:

$\Delta T2PInflow_{i,n} = -1 \times T2PDn_i(10 \times \log_{10}(T2PInflow_{i,n-1}) + PilotStrength_i(PilotStrength_{n,s}), FRAB_n)$ wherein $T2PUp_i$ is an upward ramping function for flow i, wherein $T2PDn_i$ is a downward ramping function for flow i, and wherein PilotStrength is a measure of the serving sector pilot power versus the pilot power of the other sectors.

10. An access terminal that is configured for wireless communication with an access network within a sector, comprising:

means for estimating a current value of a reverse activity bit transmitted by the access network;

means for decreasing a current power allocation for each flow of a plurality of flows on the access terminal if the estimated current value of the reverse activity bit indicates that the sector is busy, the magnitude of the decrease for a particular flow being determined according to a downward ramping function that is designed for the flow, the downward ramping function being a function of the current power allocation for the flow; and means for increasing the current power allocation for each flow of the plurality of flows on the access terminal if the estimated current value of the reverse activity bit indicates that the sector is idle, the magnitude of the increase for a particular flow being determined according to an upward ramping function that is designed for the flow, the upward ramping function being a function of the current power allocation for the flow.

11. The access terminal of claim 10, further comprising:

means for estimating a loading level of the sector; and means for determining a peak power allocation for each flow of the plurality of flows, the peak power allocation for a particular flow being a function of the current power allocation for the flow and the estimate of the loading level of the sector.

12. The access terminal of claim 10, further comprising, for each flow:

means for determining an accumulated power allocation for the flow;

means for using the current power allocation for the flow and the accumulated power allocation for the flow to determine a total available power for the flow; and means for using the total available power for the flow to determine a power level for a packet that is transmitted to the access network.

13. In an access terminal that is configured for wireless communication with an access network within a sector, a method comprising:

estimating a current value of a reverse activity bit transmitted by the access network;

if the estimated current value of the reverse activity bit indicates that the sector is busy, decreasing a current power allocation for each flow of a plurality of flows on the access terminal, the magnitude of the decrease for a particular flow being determined according to a downward ramping function that is designed for the flow, the downward ramping function being a function of the current power allocation for the flow; and if the estimated current value of the reverse activity bit indicates that the sector is idle, increasing the current power allocation for each flow of the plurality of flows on the access terminal, the magnitude of the increase for a particular flow being determined according to an upward ramping function that is designed for the flow, the upward ramping function being a function of the current power allocation for the flow.

* * * * *